United States Patent
Noguchi et al.

(10) Patent No.: US 8,139,845 B2
(45) Date of Patent: Mar. 20, 2012

(54) EVALUATION OBJECT PATTERN DETERMINING APPARATUS, EVALUATION OBJECT PATTERN DETERMINING METHOD, EVALUATION OBJECT PATTERN DETERMINING PROGRAM AND PATTERN EVALUATING SYSTEM

(75) Inventors: Takashi Noguchi, Machida (JP); Shigetoshi Sameshima, Machida (JP); Shigeki Kurihara, Hitachinaka (JP); Tamao Ishikawa, Hitachinaka (JP); Yutaka Tandai, Hitachinaka (JP)

(73) Assignee: Hitachi High-Technologies Corporation, Tokyo (JP)

( * ) Notice: Subject to any disclaimer, the term of this patent is extended or adjusted under 35 U.S.C. 154(b) by 708 days.

(21) Appl. No.: 12/257,551

(22) Filed: Oct. 24, 2008

(65) Prior Publication Data

US 2009/0110262 A1 Apr. 30, 2009

(30) Foreign Application Priority Data

Oct. 25, 2007 (JP) .................................. 2007-277071

(51) Int. Cl.
*G06K 9/62* (2006.01)

(52) U.S. Cl. ........................................ 382/145; 382/209

(58) Field of Classification Search .................. 382/145, 382/209, 149
See application file for complete search history.

(56) References Cited

U.S. PATENT DOCUMENTS 7,869,966 B2 * 1/2011 Okabe et al. ..................... 702/82

FOREIGN PATENT DOCUMENTS

JP 2004-228394 8/2004
* cited by examiner

*Primary Examiner* — Layla Lauchman
(74) *Attorney, Agent, or Firm* — Antonelli, Terry, Stout & Kraus, LLP.

(57) ABSTRACT

There is provided an evaluation object pattern determining apparatus capable of determining local patterns to be evaluated. The apparatus is for use in a pattern evaluating system storing patterns of a LSI chip as CAD data, picking out coordinates of local patterns whose process margin is small from the CAD data by way of simulation and assisting observation of the local patterns produced in a fabrication line. The apparatus includes a risk level map creating section for creating risk level maps in which risk areas are disposed. The risk area is assigned with a risk level obtained by digitizing that the risk area is an area whose process margin is smaller than other areas. The apparatus also includes a superimposition processing section for superimposing the coordinates of the local patterns with the risk level map to pick out the coordinates of the local patterns located within the risk area.

11 Claims, 21 Drawing Sheets

FIG.4

213 RISK LEVEL MAP

| | |
|---|---|
| IDENTIFIER | 401 |
| INTEGRATION FLAG | 402 |
| CHARACTERISTIC TYPE | 403 |
| NUMBER OF CHARACTERISTIC PROPERTIES | 404 |
| CHARACTERISTIC PROPERTY A | 405 |
| ⋮ | |
| NUMBER OF AREAS | 408 |

| IDENTIFIER | UPPER LEFT COORDINATE | SIZE | RISK LEVEL |
|---|---|---|---|
| ⋮ | ⋮ | ⋮ | ⋮ |
| 409 | 410 | 411 | 412 |

FIG.5

215 HOT SPOT INFORMATION

| ORIGINAL CAD DATA IDENTIFIER | | 501 |
|---|---|---|
| HOT SPOT SEQUENCE NUMBER | | 502 |
| FABRICATION CONDITION (503) | INSPECTION CONDITION | 504 |
| NUMBER OF HOT SPOTS | | 505 |
| IDENTIFIER | COORDINATE | CATEGORY |
| ⋮ (506) | ⋮ (507) | ⋮ (508) |

FIG.6

212 PROCESSING RESULT

| ORIGINAL CAD DATA IDENTIFIER (601) | HOT SPOT SEQUENCE NUMBER (602) |
|---|---|
| SUPERIMPOSITION RESULT SEQUENCE NUMBER | 603 |
| ORIGINAL RISK LEVEL MAP IDENTIFIER | 604 |
| BOUNDARY CONTROL PARAMETER 1 (605) | BOUNDARY CONTROL PARAMETER 2 (606) |
| NUMBER OF HOT SPOTS AFTER SUPERIMPOSITION | 607 |
| IDENTIFIER | COORDINATE | RISK LEVEL |
| ⋮ (608) | ⋮ (609) | ⋮ (610) |

FIG.7

214 SELECTION AND
COMPLEMENTATION
RESULT

| ORIGINAL CAD DATA IDENTIFIER | | HOT SPOT SEQUENCE NUMBER | |
|---|---|---|---|
| SUPERIMPOSITION RESULT SEQUENCE NUMBER | | | |
| SELECTION AND COMPLEMENTATION RESULT SEQUENCE NUMBER | | | |
| NUMBER OF SELECTED HOT SPOTS | | | |
| IDENTIFIER | COORDINATE | RISK LEVEL | COMMENT |
| ⋮ | ⋮ | ⋮ | ⋮ |
| NUMBER OF COMPLEMENTED HOT SPOTS | | | |
| IDENTIFIER | COORDINATE | RISK LEVEL | COMMENT |
| ⋮ | ⋮ | ⋮ | ⋮ |

701 — ORIGINAL CAD DATA IDENTIFIER
702 — HOT SPOT SEQUENCE NUMBER
714 — SUPERIMPOSITION RESULT SEQUENCE NUMBER
713 — SELECTION AND COMPLEMENTATION RESULT SEQUENCE NUMBER
705 — NUMBER OF SELECTED HOT SPOTS
703
704 — IDENTIFIER
707 — COMMENT
706
712 — NUMBER OF COMPLEMENTED HOT SPOTS
711
708 — IDENTIFIER
709, 710

FIG.8A RISK LEVEL DISTRIBUTION CONDITION

| RISK LEVEL RANGE | DISTRIBUTION CONSTANT | ATTENUATION CONSTANT |
|---|---|---|
| 1~5 | 0 | 0 |
| 6~10 | 3 | 1 |
| 11~15 | 6 | 1 |
| 16~20 | 9 | 2 |
| 21~25 | 12 | 3 |
| ⋮ | ⋮ | ⋮ |

FIG.8B DISTRIBUTED IMAGE IN CASE OF RISK LEVEL 7

| | | | | | | | | | | |
|---|---|---|---|---|---|---|---|---|---|---|
| | | | | | | | | | | |
| | | | 4 | 4 | 4 | 4 | 4 | 4 | 4 | |
| | | | 4 | 5 | 5 | 5 | 5 | 5 | 4 | |
| | | | 4 | 5 | 6 | 6 | 6 | 5 | 4 | |
| | | | 4 | 5 | 6 | 7 | 6 | 5 | 4 | |
| | | | 4 | 5 | 6 | 6 | 6 | 5 | 4 | |
| | | | 4 | 5 | 5 | 5 | 5 | 5 | 4 | |
| | | | 4 | 4 | 4 | 4 | 4 | 4 | 4 | |

(12)  United States Patent

EVALUATION OBJECT PATTERN DETERMINING APPARATUS, EVALUATION OBJECT PATTERN DETERMINING METHOD, EVALUATION OBJECT PATTERN DETERMINING PROGRAM AND PATTERN EVALUATING SYSTEM

CROSS REFERENCE TO RELATED APPLICATIONS

This application claims the foreign priority benefit under Title 35, United States Code, §119 (a)-(d) of Japanese Patent Application No. 2007-277071, filed on Oct. 25, 2007 in the Japan Patent Office, the disclosure of which is herein incorporated by reference in its entirety.

BACKGROUND OF THE INVENTION

1. Field of the Invention

The present invention relates to a pattern evaluating system for evaluating a local pattern whose process margin is small on a LSI chip and more specifically to an evaluation object pattern determining apparatus for determining the local pattern to be evaluated. Still more, the invention relates to an evaluation object pattern determining method for determining the local pattern to be evaluated and an evaluation object pattern determining program for causing a computer to determine the local pattern to be evaluated.

2. Description of Related Art

With the advancing miniaturization of patterns of LSI chips, such patterns as having a line width even less than a wavelength of exposure light have been created and a super-resolution technology such as an optical proximity correction has been introduced in manufacturing semiconductor devices such as the LSI chips. However, it is still difficult to completely remove inclination (slack) of sidewalls or roundness of corners of the pattern of the LSI chip even by the super-resolution technology and it is important to fully evaluate the pattern after forming it. There has been known a method of evaluating such patterns by using CAD (Computer Aided Design) data as a method for evaluating the patterns formed on a wafer as disclosed in Japanese Patent Application Laid-Open No. 2004-228394 for example.

JP 2004-228394A discloses that it comprises a means for determining position (coordinates) of a pattern to be evaluated by employing the CAD data, an image acquiring means for acquiring an electron beam image of the actual pattern at the position determined as described above, a means for picking out a white band that corresponds to an edge portion of the actual pattern from the electron beam image and a means for evaluating a geometry of the pattern by superimposing the white band with the CAD data. JP 2004-228394A describes that it is capable of detecting changes of focus and aberration of an exposing apparatus because it can evaluate changes of the geometry of the pattern by such indices as a displacement, an expansion and/or shrinkage and a deformation volume of the pattern.

Heretofore, local patterns having a small process margin have been picked out of a wide range pattern of a LSI chip by way of simulation as described in JP 2004-228394A to determine the position (coordinates) of the pattern to be evaluated by using the CAD data. However, it has been considered that it takes an enormous amount of time to evaluate the all local patterns in manufacturing the LSI chips and in a mass-production stage in particular because there is a case when a number of the picked out local patterns becomes enormous. Meanwhile, although it is required to evaluate the all local patterns to be evaluated in the mass-production stage of the LSI chips, there is a case when the local patterns to be evaluated are not contained in the local patterns picked out by way of the simulation. Thus, there have been the cases when the number of the local patterns to be evaluated is excessive or insufficient.

It has become clear that the local patterns that are not necessary to be evaluated are contained in fabricating the LSI chips and in the mass-production stage in particular when all of the local patterns were evaluated and studied. It is possible to shorten the evaluation time and to have a temporal margin of adding omitted local patterns in the evaluation by skipping the evaluation of those local patterns unnecessary to be evaluated. Thus, the evaluation may be carried out efficiently.

SUMMARY OF THE INVENTION

Accordingly, the present invention seeks to provide an evaluation object pattern determining apparatus, an evaluation object pattern determining method, an evaluation object pattern determining program and a pattern evaluating system capable of determining the local patterns to be evaluated in a degree of causing no omission.

According to the invention, there is provided an evaluation object pattern determining apparatus for use in a pattern evaluating system having a CAD data managing section storing patterns of a LSI chip as CAD data, a simulator for picking out coordinates of local patterns whose process margin is small out of the patterns of the LSI chip from the CAD data by way of simulation and an observation instrument for assisting observation of the local patterns of the LSI chip produced in a fabrication (fabrication) line.

The evaluation object pattern determining apparatus determines coordinates of the local patterns to be observed by the observation instrument out of the coordinates of the local patterns picked out by the simulator and includes a risk level map creating section for creating a risk level map in which risk areas are disposed on the pattern of the LSI chip, the risk areas being assigned with risk levels obtained by digitizing that the risk area is an area whose process margin is smaller than that of other areas by the CAD data and at least one of data acquired in the fabrication line, and a superimposition processing section for superimposing the coordinates of the local patterns with the risk level map to pick out the coordinates of the local patterns located within the risk area.

According to the invention, there is also provided an evaluation object pattern determining method for use in a pattern evaluating system having a CAD data managing section storing patterns of a LSI chip as CAD data, a simulator for picking out coordinates of local patterns whose process margin is small out of the patterns of the LSI chip from the CAD data by way of simulation and an observation instrument for assisting observation of the local patterns of the LSI chip produced in a production (fabrication) line.

The evaluation object pattern determining method determines coordinates of the local patterns to be observed by the observation instrument out of the coordinates of the local patterns picked out by the simulator and includes a risk level map creating step of creating a risk level map in which risk areas are disposed on the pattern of the LSI chip, the risk areas being assigned with risk levels obtained by digitizing that the risk area is an area whose process margin is smaller than that of other areas by the CAD data and at least one of production (fabrication) data acquired in the fabrication line, and a superimposition processing step of superimposing the coordinates of the local patterns with the risk level map to pick out the coordinates of the local patterns located within the risk area.

According to the invention, there is further provided an evaluation object pattern determining program for use in a pattern evaluating system having a CAD data managing section storing patterns of a LSI chip as CAD data, a simulator for picking out coordinates of local patterns whose process margin is small out of the pattern of the LSI chip from the CAD data by way of simulation and an observation instrument for assisting observation of the local patterns of the LSI chip produced in a fabrication line.

The evaluation object pattern determining program causes a computer to determine coordinates of the local patterns to be observed by the observation instrument out of the coordinates of the local patterns picked out by the simulator and causes the computer to execute a risk level map creating procedure of creating a risk level map in which risk areas are disposed on the pattern of the LSI chip, the risk areas being assigned with risk levels obtained by digitizing that the risk area is an area whose process margin is smaller than that of other areas by the CAD data and at least one of fabrication data acquired in the fabrication line, and a superimposition processing procedure of superimposing the coordinates of the local patterns with the risk level map to pick out the coordinates of the local patterns located within the risk area.

According to the invention, there is also provided a pattern evaluating system having a CAD data managing section storing patterns of a LSI chip as CAD data, a simulator for picking out coordinates of local patterns whose process margin is small out of the pattern of the LSI chip from the CAD data by way of simulation and an observation instrument for assisting observation of the local patterns of the LSI chip produced in a fabrication line to evaluate the local pattern. The pattern evaluating system also has an evaluation object pattern determining apparatus for determining coordinates of the local patterns to be observed by the observation instrument out of the coordinates of the local patterns picked out by the simulator. The evaluation object pattern determining apparatus includes a risk level map creating section for creating a risk level map in which risk areas are disposed on the pattern of the LSI chip, the risk areas being assigned with risk levels obtained by digitizing that the risk area is an area whose process margin is smaller than that of other areas by the CAD data and at least one of fabrication data acquired in the fabrication line, and a superimposition processing section for superimposing the coordinates of the local patterns with the risk level map to pick out the coordinates of the local patterns located within the risk area.

Thus, according to the invention, it is possible to provide the evaluation object pattern determining apparatus, the evaluation object pattern determining method, the evaluation object pattern determining program and the pattern evaluating system capable of determining the local patterns to be evaluated within a degree of causing no omission.

It is noted that the summary of the invention described above does not necessarily describe all necessary features of the invention. The invention may also be a sub-combination of the features described above.

BRIEF DESCRIPTION OF THE DRAWINGS

FIG. 4 is a structural diagram of a data structure of a risk level map;

FIG. 5 is a structural diagram of a data structure of hot spot information;

FIG. 6 is a structural diagram of a data structure of a processing result;

FIG. 7 is a structural diagram of a data structure of a selection and/or complementation result;

FIG. 8A is a structural diagram of a data structure of a risk level distribution conditions;

FIG. 8B is a distribution image of a case when the risk level of the mesh having the risk level of 7 is distributed;

DESCRIPTION OF THE MOST PREFERRED EMBODIMENT

Figure 1:
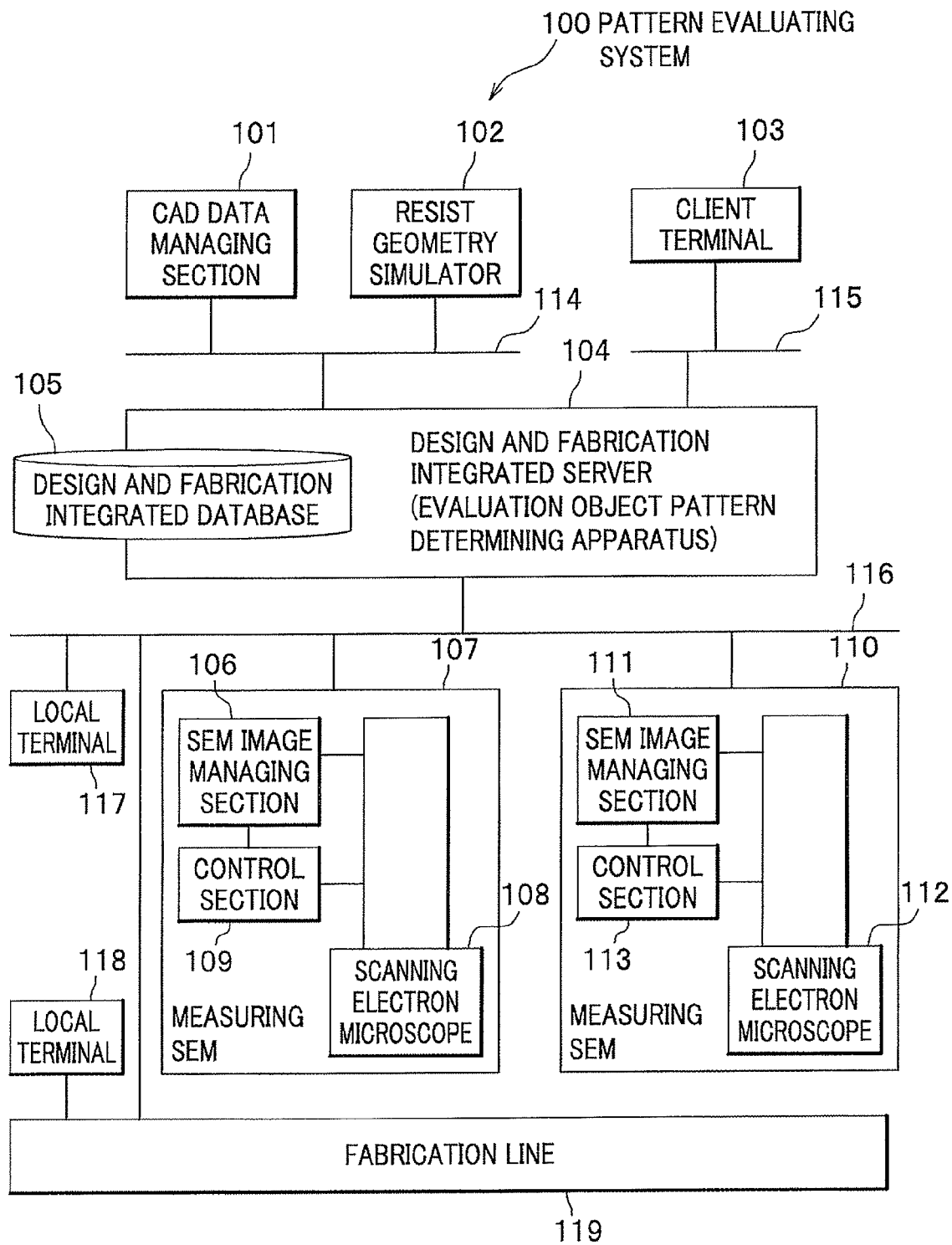
FIG. 1 is a structural diagram of a pattern evaluating system according to the embodiment of the invention.

A preferred embodiment of the invention will be explained in detail below with reference to the drawings. It is noted that the same or corresponding parts in the drawings described below will be denoted by the same reference numerals and their overlapped explanation will be omitted.

FIG. 1 is a structural diagram of a pattern evaluating system 100 according to the embodiment of the invention. To evaluate local patterns, the pattern evaluating system 100 has a CAD data managing section 101 for storing a wide range pattern of a LSI chip as CAD data, a resist geometry simulator 102 for picking out coordinates (coordinates of hot spots) of local patterns having small a process margin within in the wide range pattern from the CAD data by way of simulation, measuring SEMs (observation devices) 107 and 110 for assisting observation of the local patterns of the LSI chip produced in a fabrication line, a client terminal 103 that can be operated by an operator of the pattern evaluating system 100, local terminals 117 and 118 disposed for example in the vicinity of the fabrication line 119 of the LSI chip and a design and fabrication integrated server (evaluation object pattern determining apparatus) 104.

The design and fabrication integrated server (evaluation object pattern determining apparatus) 104 is connected with the CAD data managing section 101 and the resist geometry simulator 102 through a network 114. The design and fabrication integrated server 104 is also connected with the client terminal 103 through a network 115. The design and fabrication integrated server 104 is further connected with the measuring SEMs 107 and 110, the fabrication line 119 and the local terminals 117 and 118 through a network 116.

The design and fabrication integrated server 104 has a design and fabrication integrated database 105. The design and fabrication integrated server 104 determines a local pattern to be observed by the measuring SEMs 107 and 110 out of the local patterns (hot spots) picked out by the resist geometry simulator 102.

The resist geometry simulator 102 receives the CAD data from the CAD data managing section 101 that manages the CAD data to simulate a geometry of a resist, so that it can determine the local patterns to be evaluated (hot spots) without causing omission for a lithographic process in a fabrication of the LSI chips and can provide them to the design and fabrication integrated server 104.

The measuring SEMs 107 and 110 respectively have scanning electron microscopes (SEM) 108 and 112, control sections 109 and 113 for carrying out imaging processes on the patterns of the LSI chip by controlling the scanning electron microscopes 108 and 112 and SEM image managing sections 106 and 111 for storing and managing SEM images that are results of the imaging processes. The control sections 109 and 113 allow imaging of the local patterns by creating recipes for performing the imaging processes by receiving simulation results of the resist geometry (coordinates and others of the local patterns (hot spots)).

Figure 2:
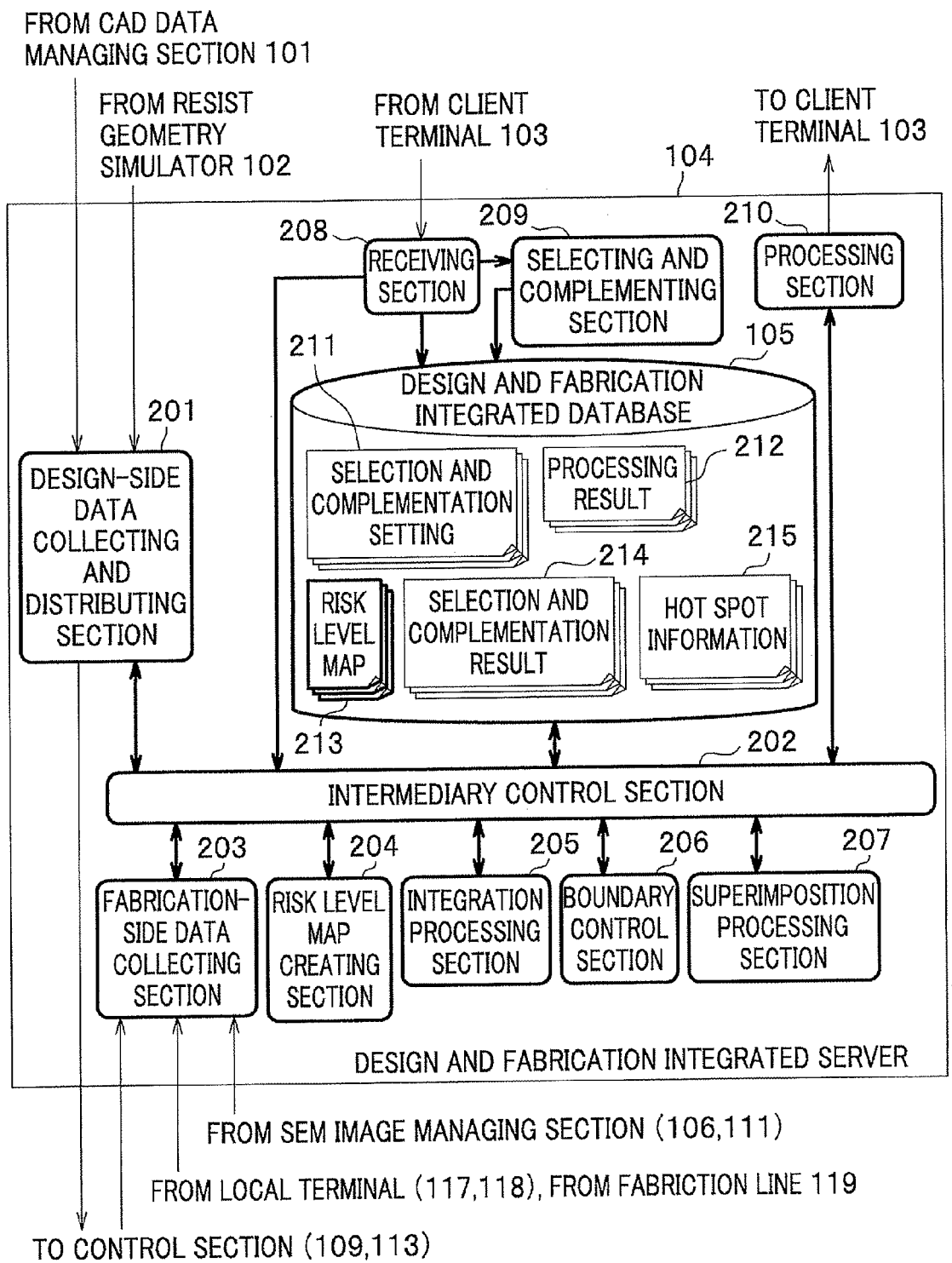
FIG. 2 is a structural diagram of an evaluation object pattern determining apparatus (design and fabrication integrated server) of the embodiment of the invention.

FIG. 2 shows a structural diagram of the design and fabrication integrated server (evaluation object pattern determining apparatus) 104 of the embodiment of the invention. In addition to the design and fabrication integrated database 105, the design and fabrication integrated server (evaluation object pattern determining apparatus) 104 has a design-side data collecting and distributing section 201, an intermediary control section 202, a fabrication-side data collecting section 203, a risk level map creating section 204, an integration processing section 205, a boundary control section 206, a superimposition processing section 207, a receiving section 208, a selecting/complementing section 209 and a processing section 210. The design and fabrication integrated server 104 receives data from the CAD data managing section 101, the resist geometry simulator 102, the client terminal 103, the SEM image managing sections 106 and 111, the local terminals 117 and 118 and the fabrication line 119 and inputs/outputs data to the client terminal 103 and the control sections 109 and 113. Then, the design and fabrication integrated server 104 stores a selection and/or complementation setting 211, a risk level map 213, a processing result 212, a selection and/or complementation result 214 and hot spot (local pattern) information 215 in the design and fabrication integrated database 105. It is noted that the each hot spot within the hot spot information 215 is data generated by the resist geometry simulator 102 by receiving the CAD data from the CAD data managing section 101 and by picking out the local pattern having small process margin based on the CAD data. That is, the local pattern having the small process margin coincides with each of the respective hot spots within the hot spot information 215.

It is noted that because a purpose of the pattern evaluating system 100 is to evaluate the state of formation of the local patterns (hot spots) by enlarging and observing them by the measuring SEMs 107 and 110, the pattern evaluating system 100 requires no information about the geometry of the local patterns and requires only the coordinates of the local patterns (hot spots). That is, it is naturally possible to image surrounding areas of the coordinates of the local pattern (hot spot) and to observe the local pattern by observing the position of the coordinates of the local pattern (hot spot) by the measuring SEMs 107 and 110. From these facts, the hot spot needs not have the information about the geometry of the local pattern having the small process margin and may be a point positioned at the coordinates of the local pattern having the small process margin. Therefore, the hot spot is stored in the hot spot information 215 as Coordinates 507 (see FIG. 5) as described later.

Conversely, because the coordinates of the local pattern are equal to those of the hot spot, it is possible to pick out the information about the geometry of the local pattern from the coordinates of the hot spot by using the CAD data and to superimpose the local pattern, instead of the hot spot, with a risk level map in a superimposition process described later. It is also possible to superimpose not the local pattern with the risk level map but to superimpose the hot spot and a wide range pattern with the risk level map in the superimposition process described later.

Specifically, the risk level map creating section 204 creates the risk level map 213 in which risk areas assigned with a risk level digitizing that their process margin is smaller than other areas are disposed on the wide range pattern of the LSI chip by the CAD data and at least by one fabrication data acquired in the fabrication line 119.

The superimposition processing section 207 superimposes the respective hot spots within the hot spot information 215 with the risk level map 213. As a result, it becomes possible to pick out the hot spots within the hot spot information 215 located within the risk area out of the hot spot information 215. Note that the chip coordinates are set in the wide range pattern of the LSI chip. Then, the positions of the respective hot spots and the risk areas within the hot spot information 215 may be specified by the common chip coordinates. Accordingly, the respective hot spots located within the risk area may be clearly picked out.

The boundary control section 206 carries out at least a task of deleting the risk area assigned with the risk level of less than a threshold value of the risk level from the risk level map 213 or of deleting the risk area disposed in areas other than important areas from the risk level map 213. The boundary control section 206 allows the hot spots within the hot spot information 215 located within the deleted risk area to be removed out of the object of evaluation.

When the risk level map creating section 204 creates a plurality of risk level maps 213, the integration processing section 205 divides the wide pattern of the LSI chip to generate a plurality of meshes whose respective positions correspond to the chip coordinates and calculates a combined risk level per mesh based on the risk level of the risk area per each risk level map to which the mesh belongs. A set of neighboring meshes whose combined risk levels are equal may be designated as a new risk area assigned with the combined risk level based on the combined risk level set per mesh. Then, the superimposition processing section 207 can pick out the respective hot spots within the hot spot information 215 located within this new risk area. Even if a plurality of risk level maps 213 is created, the risk level per risk level map 213 is digitized in such a tendency that the smaller the process margin, the larger the risk level per risk level map 213 is, so that the combined risk level calculated from the plurality of risk levels may readily maintain this tendency.

That is, it is possible to integrate each degree of a plurality of factors that lessen the process margin on the design side with each degree of a plurality of factors that lessen the process margin on the fabrication side by one measuring system of the risk level.

Then, according to the design and fabrication integrated server 104 of the present embodiment, it is possible to determine the hot spots to be evaluated in a degree of causing no omission by picking out the hot spots within the hot spot information 215 located within the risk area. It is also possible to perform an evaluation object pattern determining method for determining the hot spots to be evaluated within the degree of causing no omission by operating the design and fabrication integrated server 104 of the embodiment. The design and fabrication integrated server 104 may be realized by executing an evaluation object pattern determining program of the invention on a computer.

Figure 3:
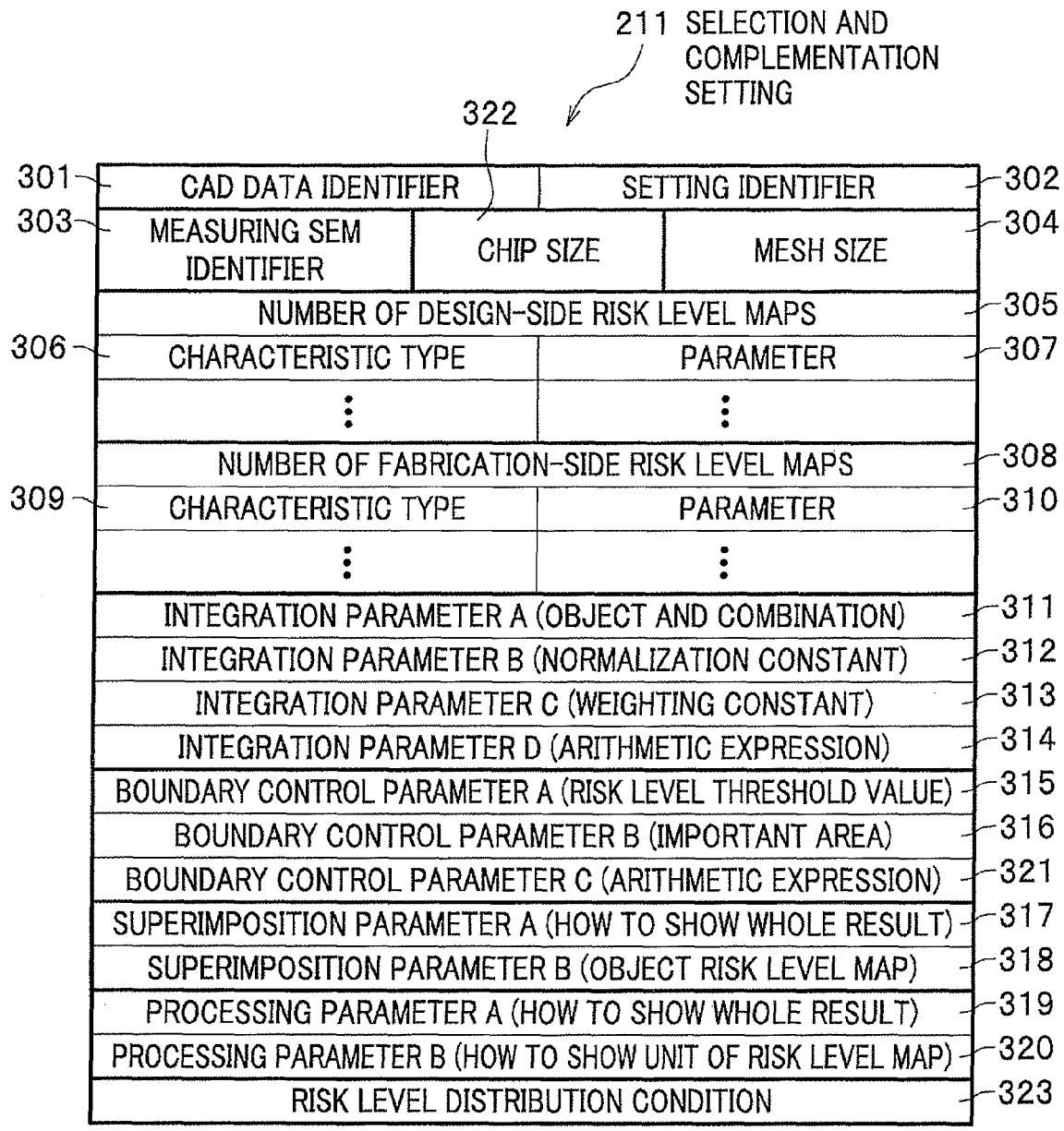
FIG. 3 is a structural diagram of a data structure of selection and/or complementation setting.

FIG. 3 shows a data structure of the selection and/or complementation setting 211. The selection and/or complementation setting 211 has fields for a CAD Data Identifier 301 and a Setting Identifier 302 for uniquely identifying the selection and/or complementation setting 211, a Measuring SEM Identifier 303 capable of identifying the measuring SEMs 107 and 110 as sources for acquiring the SEM images, a Chip Size 322 indicating a size of the LSI chip and a Mesh Size 304 of the risk level map 213 to be divided into meshes.

The selection and/or complementation setting 211 also has fields for a Number of Design-side Risk Level Maps 305 indicative of a number of design-side risk level maps, a Characteristic Type 306 of the design-side risk level map to be generated and a Parameter 307 for generating the design-side risk level map. The Characteristic Type 306 and the Parameter 307 are provided by the number of records of the Number of Design-side Risk Level Maps 305 and set generating conditions of the design-side risk level maps.

Still more, the selection and/or complementation setting 211 includes fields for a Number of Fabrication-side Risk Level Maps 308 indicative of a number of a fabrication-side risk level maps, a Characteristic Type 309 of the fabrication-side risk level map to be generated and a Parameter 310 for generating the fabrication-side risk level map. The Characteristic Type 309 and the Parameter 310 are provided by the number of records corresponding to the value of the Number of Fabrication-side Risk Level Maps 308 and specify conditions for generating the fabrication-side risk level maps.

The selection and/or complementation setting 211 also has fields for integration parameters for integrating the risk level maps 213, boundary control parameters for controlling boundaries of the risk level maps 213, superimposition parameters for superimposing the respective hot spots within the risk level maps 213 and the hot spot information 215 and processing parameters for processing results of processes using the risk level map 213 and the hot spot information 215 into maps and tables that may be readily understood by the operators.

The integration parameters include fields for an Integration Parameter A (object and combination) 311 for specifying a plurality of risk level maps 213 to be integrated, an Integration Parameter B (normalization constant) 312 for specifying a criterion of the risk levels among the plurality of risk level maps 213, an Integration Parameter C (weighting constant) 313 for weighting the maps corresponding to a degree of importance of the risk level maps 213 and an Integration Parameter D (arithmetic expression) 314 for storing arithmetic expressions for computing the risk levels among the plurality of risk level maps 213 to calculate an integrated risk level.

The boundary control parameters include fields for Boundary Control Parameter A (risk level threshold value) 315 for specifying a threshold value of the risk level, a Boundary Control Parameter B (important area) 316 for specifying an important area corresponding to an intention and others of the design of the LSI chip and a Boundary Control Parameter C (arithmetic expression) for specifying arithmetic expressions for calculating the area specified by the Boundary Control Parameter A (risk level threshold value) 315 and by the Boundary Control Parameter B (important area) 316. Specifically, logical products and logical sums may be used as the Boundary Control Parameter C (arithmetic expression) 321.

The superimposition parameters include fields for a Superimposition Parameter A (object hot spot identifier) 317 for specifying a version every time in simulating the respective hot spots to be superimposed and a Superimposition Parameter B (object risk level map) 318 for specifying an identifier of the risk level map 213 that is also to be superimposed.

The processing parameters include a Processing Parameter A (how to show the whole result) 319 for specifying how to show the whole result so that the operator can readily discriminate the respective hot spots to be evaluated and a Processing Parameter B (how to show the risk level map unit) for specifying how to show the risk level map 213 to the operator. For instance, the Processing Parameter A (how to show the whole result) may show the respective hot spots within the hot spot information 215 in the order of the risk level of the risk area to which the hot spots belong from more to less or may show the hot spots in the order of the size of the chip coordinates where the hot spot is positioned from smaller to larger. The Processing Parameter B (how to show the risk level map unit) 320 may show the order of the risk level of the risk area to which the hot spot belongs at the position of the hot spot.

Finally, the selection and/or complementation setting 211 has, as a field, a Risk Level Distribution Condition 323 for defining conditions for distributing the risk level calculated per mesh to the surrounding meshes.

FIG. 4 is a structural diagram of a data structure of the risk level map 213. The risk level map 213 has fields for an Identifier 401 for uniquely identifying the risk level map 213 and an Integration Flag 402 indicating whether or not an integration process is to be carried out.

The risk level map 213 has fields for a Characteristic Type 403 indicative of characteristics of the risk level map 213, a Number of Characteristic Properties 404 indicating a number of characteristic properties and a Characteristic Property A405 storing the respective characteristic properties.

Still more, the risk level map 213 has fields for a Number of Areas 408 of the risk areas composing the risk level map 213, an Identifier 409 of the risk areas per risk area, an Upper Left Coordinate 410 of the risk area on the chip coordinates, Vertical and Horizontal Sizes 411 of the risk area and a Risk Level 412 assigned to the risk area.

When an identifier indicative of "exist" is stored in the Integration Flag 402, an integration process of the risk level map 213 is stored in the Characteristic Type 403 and parameters used in the integration process are stored in the characteristic property. When an identifier indicative of "nil" is stored in the Integration Flag 402, the Characteristic Type 306 or 309 in the selection and/or complementation setting 211 in FIG. 3 is stored in the Characteristic Type 403 and the Parameter 307 or 310 is stored in the Characteristic Property A405. It is also possible to process the Parameter 307 or 310 and to store it in the Characteristic Property A405. Values such as an exposure amount and focus are specified per record of the Characteristic Property A405 in a case of the lithographic process. If zero (0) is stored in the Number of Characteristic Properties 404, the Characteristic Property A405 is made to be an invalid area. If zero (0) is stored in the Number of Areas 408, the Identifier 409, the Upper Left Coordinate 410 and the Risk Level 412 are made to be invalid areas.

FIG. 5 is a structural diagram of a data structure of the hot spot information 215. The hot spot information 215 includes fields for an Original CAD Data Identifier 501 that is an identifier of originating CAD data, a Hot Spot Sequence Number 502 that corresponds to a version when the hot spot is simulated, a Fabrication Condition 503 used in simulating the fabrication (lithographic process) and an Inspection Condition 504 used in the simulation of an inspection for determining whether or not a hot spot exists.

The hot spot information 215 also has fields for a Number of Hot Spots 505, an Identifier 506 of the hot spot per hot spot, Coordinates 507 of the hot spot on the chip coordinates and a Category 508 in which reasons and the like that determine a hot spot to be a hot spot are described. Records of the Identifier 506, the Coordinates 507 and the Category 508 are provided by a number corresponding to the value of the Number of Hot Spots 505.

FIG. 6 is a structural diagram of a data structure of the processing result 212. The processing result 212 has fields for an Original CAD Data Identifier 601 that corresponds to the Original CAD Data Identifier 501 of the hot spot information 215 in FIG. 5 and is an identifier of CAD data, a Hot Spot Sequence Number 602 that corresponds to the Hot Spot Sequence Number 502 of the hot spot information 215 in FIG. 5 and corresponds to a version when the hot spot is simulated, a Superimposition Result Sequence Number 603 allowing a plurality of results of the superimposition process to be discriminated and an Original Risk Level Map Identifier 604 indicating the risk level map 213 used in the superimposition process.

The processing result 212 also has fields for a Boundary Control Parameter 1 605 and a Boundary Control Parameter 2 606 that correspond to the Boundary Control Parameter A315, the Boundary Control Parameter B316 and the Boundary Control Parameter C321 in the selection and/or complementation setting 211 in FIG. 3 and that are used in the boundary control process.

Still more, the processing result 212 has fields for a Number of Hot Spots 607 after the superimposition (process), an Identifier 608 of the hot spot per each hot spot within the processing result 212 after the superimposition, Coordinates 609 of the hot spot on the chip coordinate and a Risk Level 610 assigned to the hot spot. Records of the Identifier 608, the Coordinate 609 and the Risk Level 610 are provided by a number corresponding to the value of the Number of Hot Spots after Superimposition 607 after the superimposition (process).

FIG. 7 is a structural diagram of a data structure of the Selection and/or complementation result 214. The selection and/or complementation result 214 has fields for an Original CAD Data Identifier 701 that corresponds to the Original CAD Data Identifier 501 of the hot spot information 215 in FIG. 5 and that is an identifier of the CAD data, a Hot Spot Sequence Number 702 that corresponds to the Hot Spot Sequence Number 502 of the hot spot information 215 in FIG. 5, a Superimposition Result Sequence Number 714 that corresponds to the Superimposition Result Sequence Number 603 of the processing result 212 in FIG. 6 and a Selection and/or Complementation Result Sequence Number 713 that allows the plurality of Selection and/or complementation results 214 to be discriminated from each other.

The selection and/or complementation result 214 also has fields for a Number of Selected Hot Spots 703 selected finally for evaluation, an Identifier 704 of the selected hot spots per selected hot spot, Coordinates 705 of the selected hot spot, a Risk Level 706 of the selected hot spot and a Comment 707 such as a selected reason of the selected hot spot. There are numbers of records of the Identifier 704, the Coordinates 705 and the Risk Level 706 corresponding to a value of the Number of Selected Hot Spots 703.

Still more, the selection and/or complementation result 214 has fields for a Number of Complemented Hot Spots 712 inputted from the client terminal 103 and the local terminals 117 and 118 by the operator and indicating a number of complemented hot spots for complementing the hot spots of the simulation. The selection and/or complementation result 214 also has fields for an Identifier 708 of the complemented hot spots per each complemented hot spot, a Coordinates 709 of the complemented hot spots and a Risk Level 710 of the complemented hot spot and a Comment 711 of the complemented hot spot. Records of the Identifier 708, the Coordinates 709 and the Risk Level 710 are recorded by a number corresponding to the value of the Number of Complemented Hot Spots 712. "Selected reason", "complemented reason" or the like is stored in the records for storing the Comments 707 and 711. It is also possible to store requirements related to the evaluation of the hot spot such as "whether or not the evaluation is made per LSI chip" and "whether or not evaluation without advance notice."

FIG. 8A shows a data structure of the Risk Level Distribution Condition 323 of the selection and/or complementation setting 211 in FIG. 3. The Risk Level Distribution Condition 323 has fields for a Risk Level Range 801 specifying a range of risk levels, a Distribution Constant 802 indicating a reach of distribution, i.e., a number of meshes separated from the center, and an Attenuation Constant 803 indicating how much the risk levels should be attenuated in distributing the risk level to the neighboring meshes. One set of records is constituted of the Risk Level Range 801, the Distribution Constant 802 and the Attenuation Constant 803.

For instance, when the risk level of a specific mesh is "7" as shown in FIG. 8B, the record whose risk level range is "6 to 10" is picked out according to the risk level "7" and the Risk Level Distribution Condition 323 as indicated in the Risk Level Range 801 in FIG. 8A and "3" is obtained as the Distribution Constant 802 and "1" is obtained as the Attenuation Constant 803 from the records whose risk level range is "6 to 10." Next, related meshes surrounding the mesh whose risk level is "7" in threefold are picked out in accordance to the Distribution Constant 802 of "3." Next, "6" obtained by subtracting "1" of the Attenuation Constant 803 from the risk level "7" is defined as a risk level of the first related meshes surrounding the mesh whose risk level is "7." Similarly to that, "5" obtained by subtracting "1" of the Attenuation Constant 803 from the risk level "6" is defined as a risk level of the second related meshes adjacent to the related meshes whose risk level is "6." Finally, "4" obtained by subtracting "1" of the Attenuation Constant 803 from the risk level "5" is defined as a risk level of the third related meshes surrounding the related meshes whose risk level is "5". This kind of distribution of risk level is effective when position of a pin supporting a semiconductor wafer is not always fixed and deviates more or less with respect to the semiconductor wafer, or more specifically, when the pin that is normally disposed at the position of the mesh whose risk level is "7" deviates to the position of the threefold related meshes depending on a condition.

Figure 9:
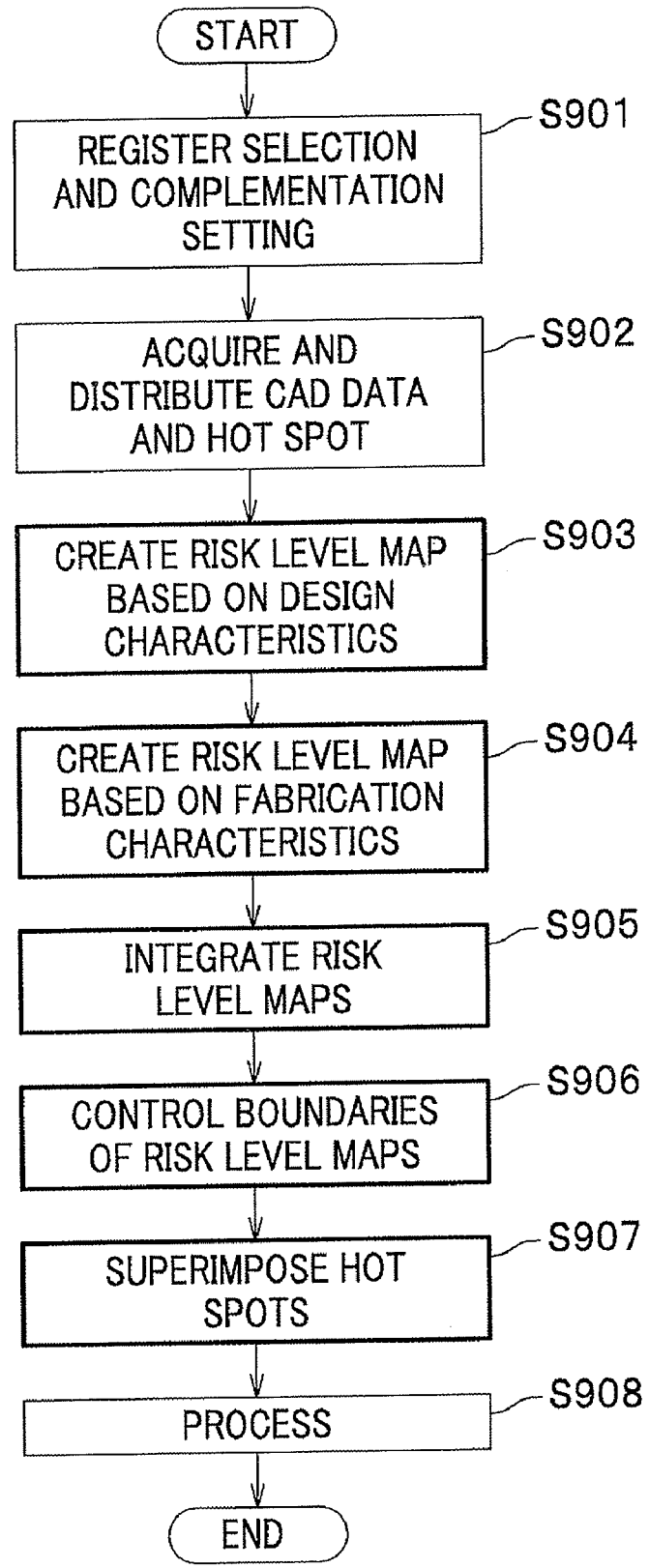
FIG. 9 is a flowchart of an evaluation object pattern determining method (hot spot selecting method) according to the embodiment of the invention.

FIG. 9 is a flowchart of an evaluation object pattern determining method (hot spot selecting method) according to the embodiment of the invention. According to the evaluation object pattern determining method, the client terminal 103 (see FIG. 1) selects or complements the hot spot information 215 in cooperation with the design and fabrication integrated server 104, the CAD data managing section 101, the resist geometry simulator 102 and the measuring SEMs 107 and 110.

At first, the client terminal 103 receives the setting related to the selection and/or complementation and transmits it to the design and fabrication integrated server 104 (see FIG. 2). The design and fabrication integrated server 104 receives the setting related selection and complementation from the client terminal 103 by the receiving section 208 (see FIG. 2), converts it into a form of the selection and/or complementation setting 211 as shown in FIG. 3 and stores (registers) the selection and/or complementation setting 211 in the design and fabrication integrated database 105 in Step S901. Here, the receiving section 208 instructs the intermediary control section 202 to start intermediary control by specifying the selection and/or complementation setting 211.

The intermediary control section 202 confirms CAD data and the hot spot information 215 (see FIG. 2) to be acquired and the measuring SEM 107 or 110 in FIG. 1 to which the data is to be distributed by referring to the CAD Data Identifier 301 and the Measuring SEM Identifier 303 of the selection and/or complementation setting 211 (see FIG. 3). Then, the intermediary control section 202 specifies and transmits an instruction of the acquisition and distribution to the design-side data collecting and distributing section 201 together with the CAD data, the hot spot information 215 (see FIG. 2) and the measuring SEM 107 or 110.

Based on the instruction, the design-side data collecting and distributing section 201 receives the CAD data and the respective hot spots from the CAD data managing section 101 and the resist geometry simulator 102 (see FIG. 1) and distributes (acquires) them to the intermediary control section 202 and the control sections 109 and 113 of the measuring SEMs 107 and 110. Receiving the CAD data and the hot spots, the intermediary control section 202 stores the CAD data in the design and fabrication integrated database 105. The intermediary control section 202 stores the hot spots as the hot spot information 215 in the design and fabrication integrated database 105. Receiving the CAD data and the hot spot information 215, the control sections 109 and 113 store them in areas not shown in FIGS. 1 and 2 (Step S902). The design-side data collecting and distributing section 201 may be also provided with a cache memory for storing the CAD data and the hot spot information 215. It is also possible to arrange to receive the CAD data and the respective hot spot information (identifier, coordinates and category) from the CAD data managing section 101 and the resist geometry simulator 102.

Figure 17:
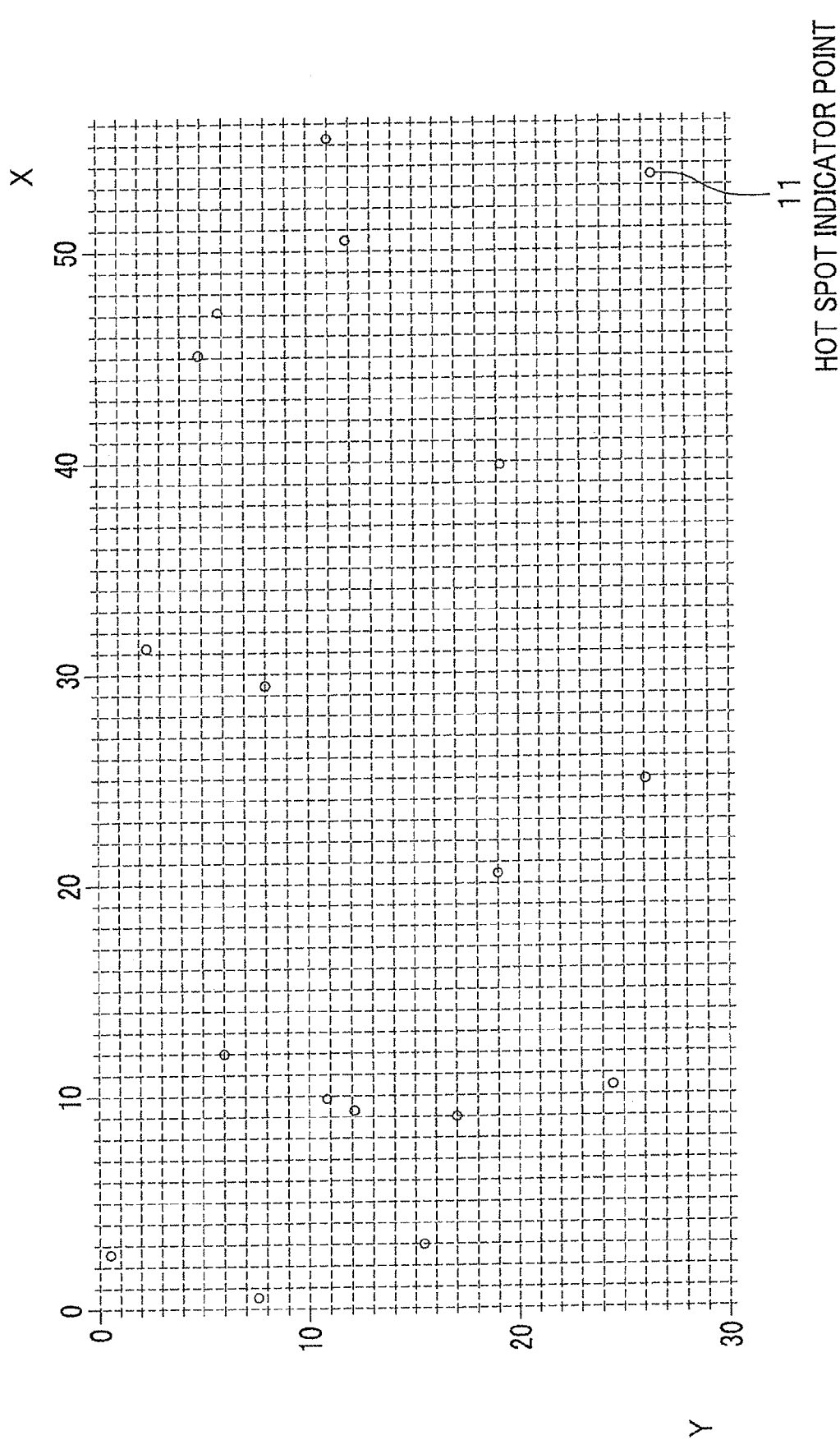
FIG. 17 is a distribution chart of hot spots on chip coordinates on which patterns are disposed.

FIG. 17 shows exemplary respective hot spots within the hot spot information 215 thus acquired. The respective hot spots within the hot spot information 215 has the Coordinates 507 as shown in FIG. 5, so that the hot spot may be indicated as a hot spot indicator point 11 for example on the chip coordinate represented by X and Y-coordinates as shown in FIG. 17. That is, a so-called distribution chart of the respective hot spots within the hot spot information 215 may be obtained.

Figure 18:
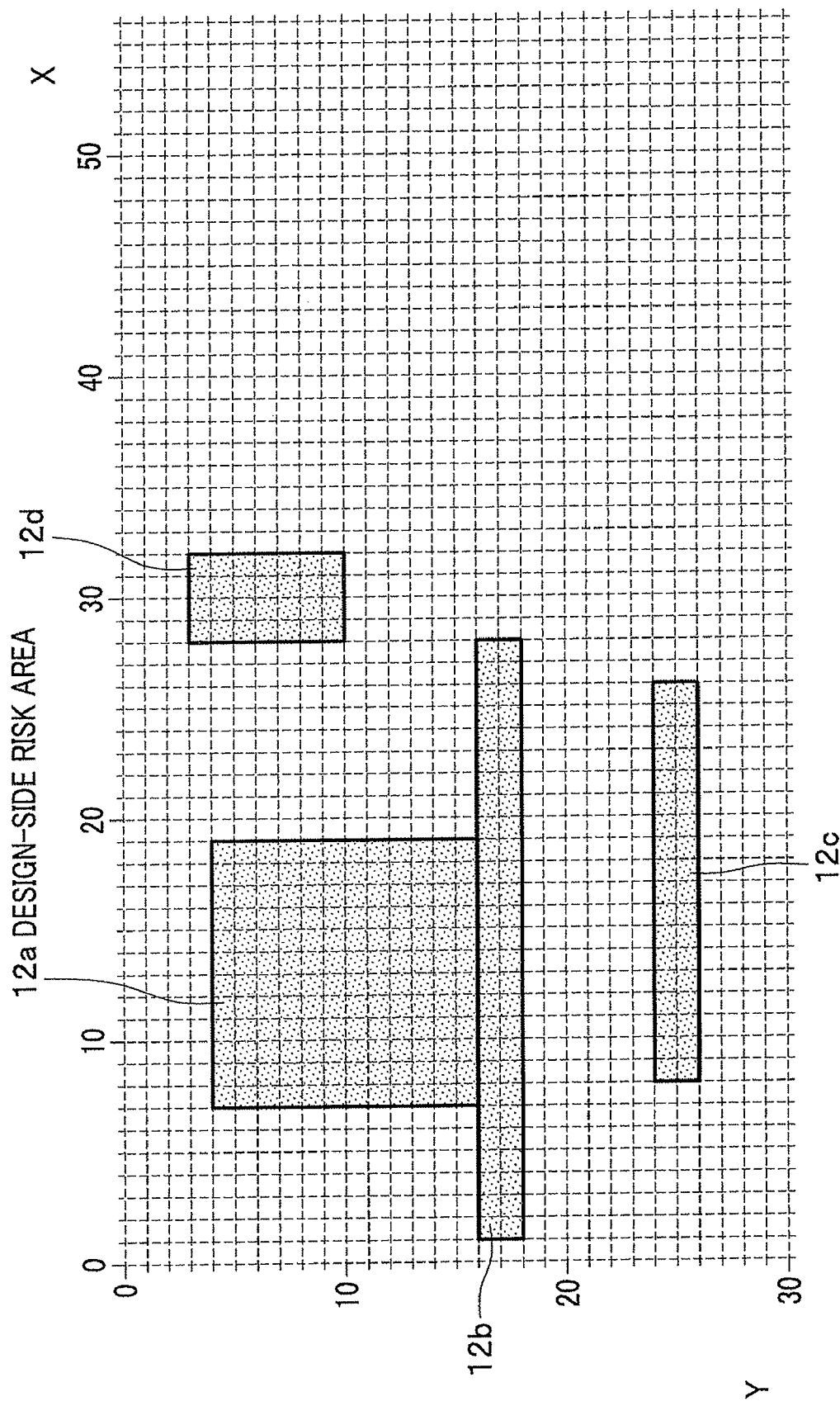
FIG. 18 is a distribution chart (design-side risk level map) of design-side risk areas on the chip coordinates on which the patterns are disposed.

As shown in FIG. 9, the intermediary control section 202 executes a process of creating the risk level map (design-side risk level map) 213 that is based on characteristics in design in cooperation with the risk level map creating section 204 in Step S903. FIG. 18 shows an exemplary design-side risk level map thus created. The design-side risk level map corresponds to the risk level map 213 and the risk level map 213 has the Upper Left Coordinate 410 and the Size 411 as shown in FIG. 4, so that the design-side risk level map may be represented as having design-side risk areas 12a, 12b, 12c and 12d for example on the chip coordinate represented by the X and Y-coordinates as shown in FIG. 18. The design-side risk areas 12a, 12b, 12c and 12d are assigned to the Risk Level 412 (see FIG. 4), respectively.

Figure 19:
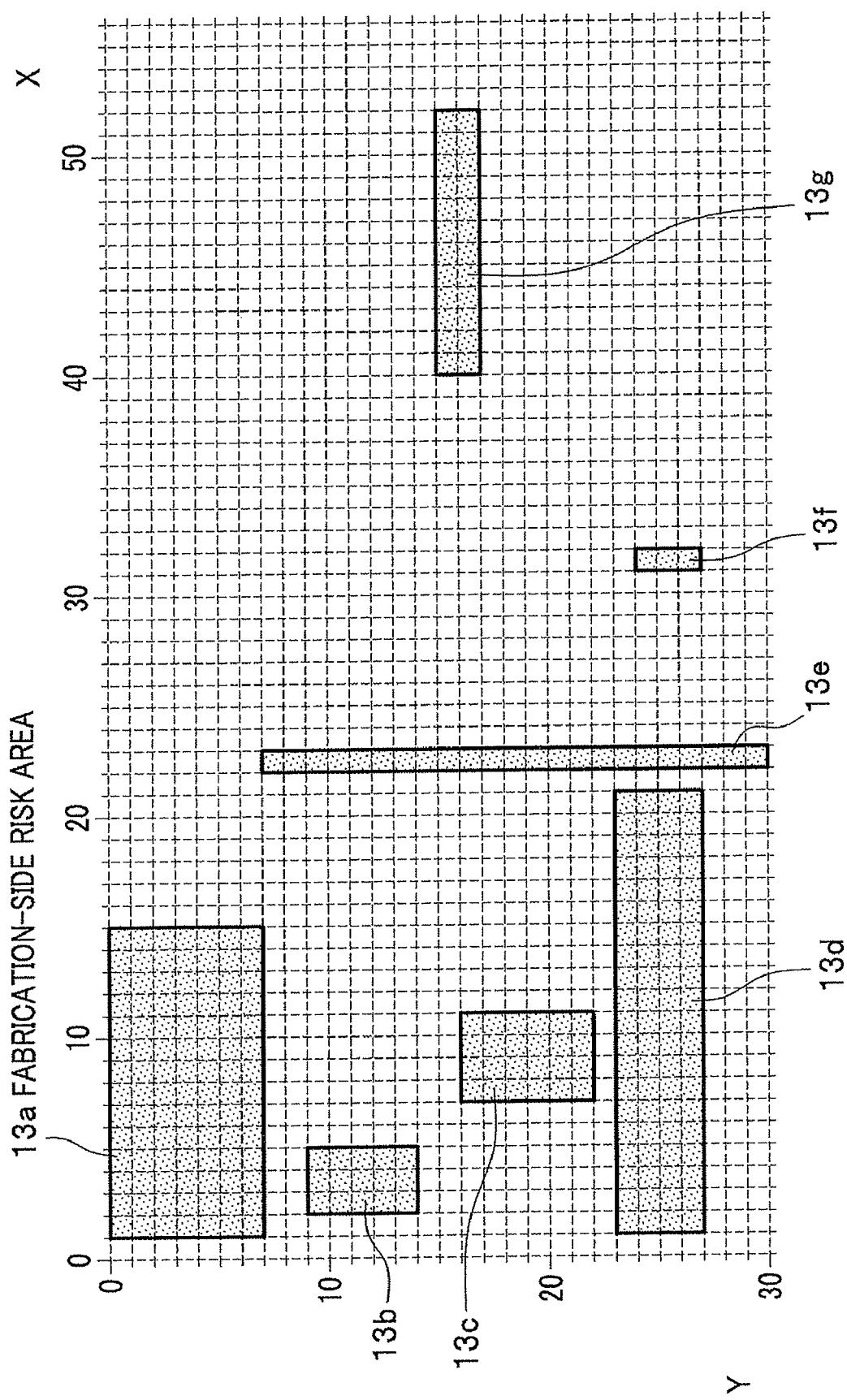
FIG. 19 is a distribution chart (fabrication-side risk level map) of design-side risk areas on the chip coordinates on which the patterns are disposed.

Returning to FIG. 9, the intermediary control section 202 executes a process for creating the risk level map (fabrication-side risk level map) 213 that is based on characteristics in fabrication in cooperation with the risk level map creating section 204. FIG. 19 shows an exemplary fabrication-side risk level map thus created. The fabrication-side risk level map also corresponds to the risk level map 213 and the risk level map 213 has the Upper Left Coordinate 410 and the Size 411 as shown in FIG. 4, so that the fabrication-side risk level map may be represented as having fabrication-side risk areas 13a, 13b, 13c, 13d, 13e, 13f and 13g for example on the chip coordinate represented by the X and Y-coordinates as shown in FIG. 19. The fabrication-side risk areas 13a, 13b, 13c, 13d, 13e, 13f and 13g are assigned to the Risk Level 412 (see FIG. 4), respectively.

Figure 20:
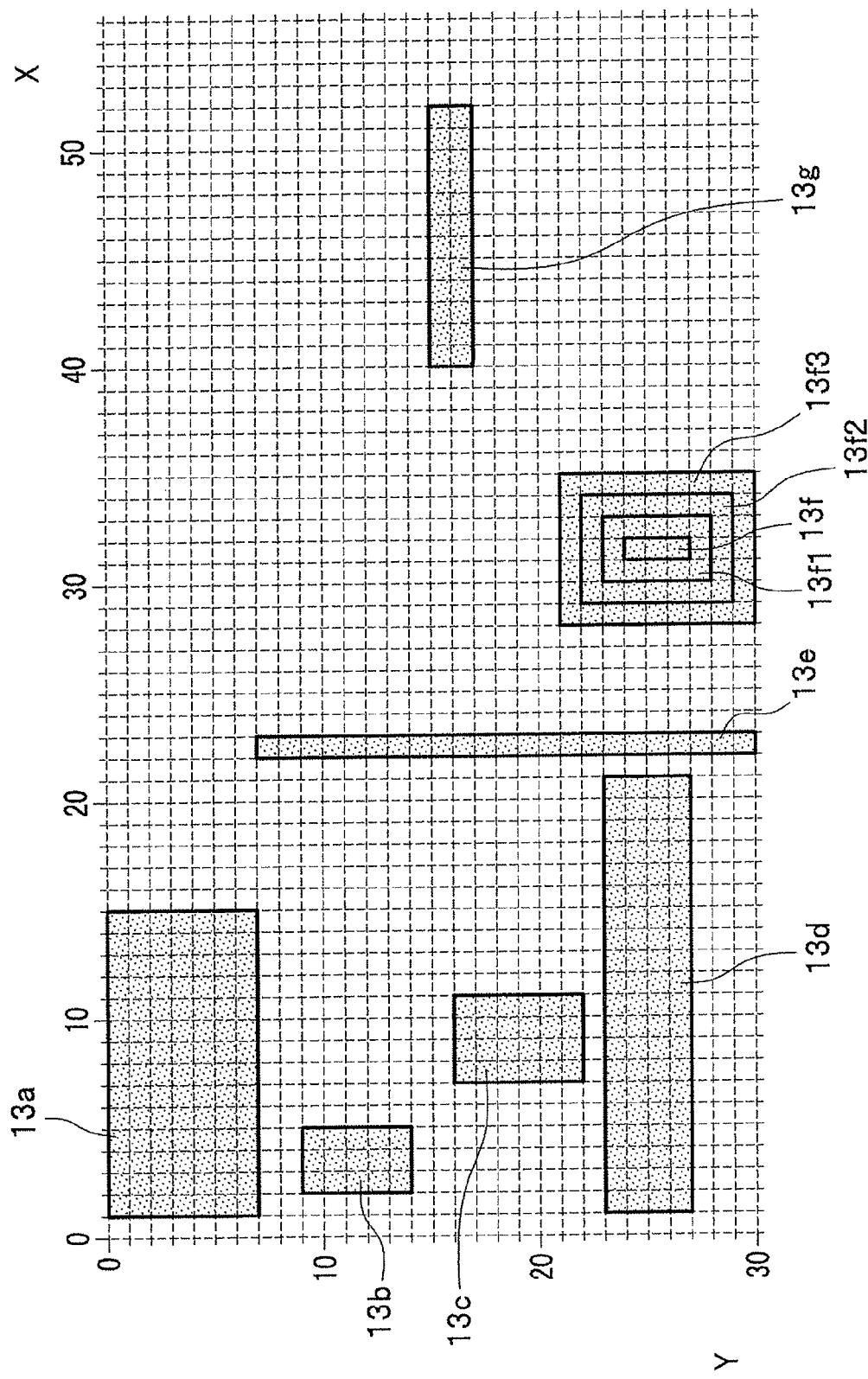
FIG. 20 is a distribution chart (fabrication-side risk level map after distribution) of the design-side risk areas after distribution on the chip coordinates on which the patterns are disposed.

The distribution explained in connection with FIG. 8B may be carried out also in this process for creating the fabrication-side risk level map. FIG. 20 shows an exemplary distributed fabrication-side risk level map. Areas divided by dotted lines representing the X and Y-coordinates correspond to the meshes. In FIG. 20, the distribution is carried out on the fabrication-side risk area 13f and threefold risk areas 13f1, 13f2 and 13f3 are generated during the distribution corresponding to the threefold related meshes surrounding the fabrication-side risk area 13f.

Figure 21:
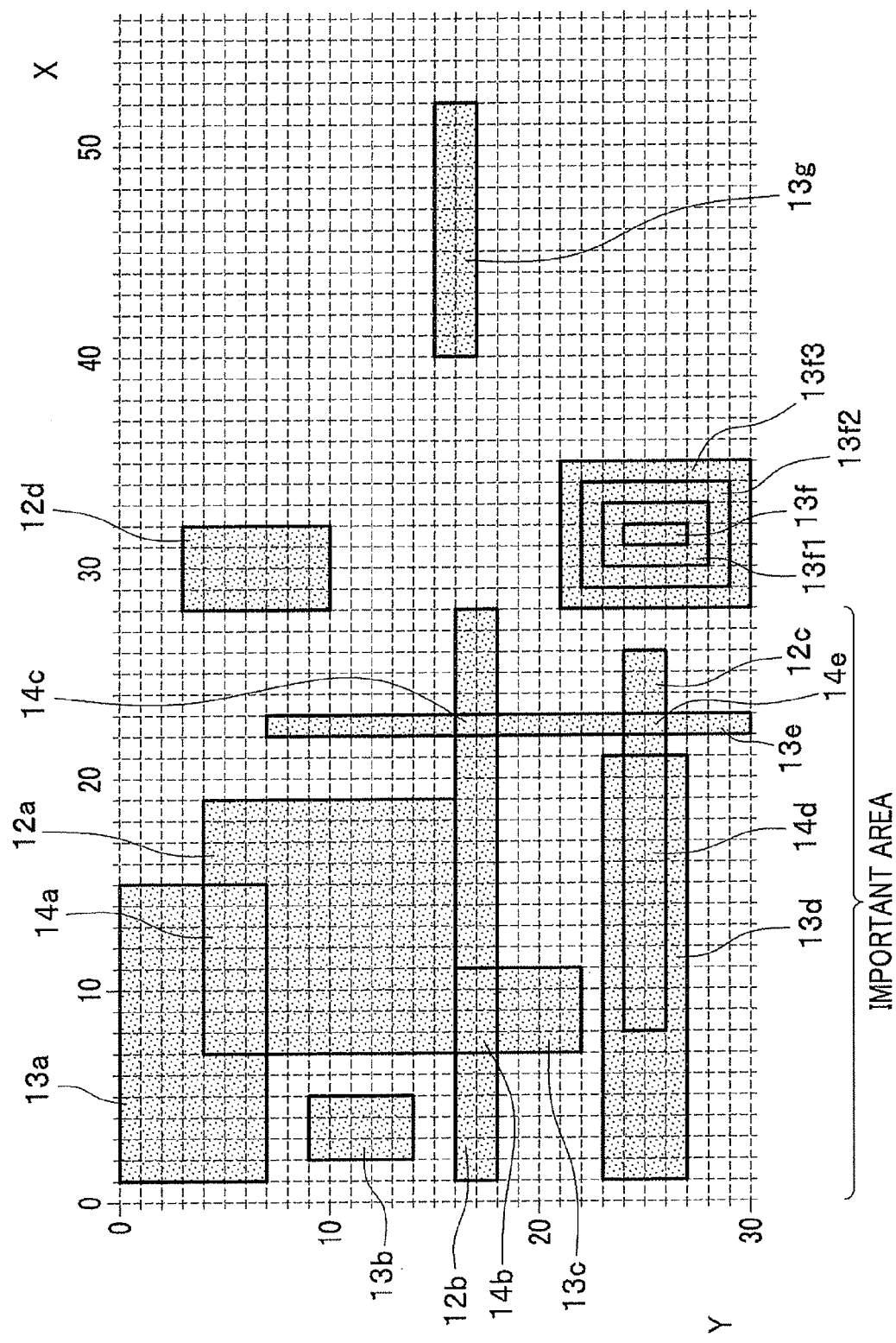
FIG. 21 is a distribution chart (integration resultant risk level map) of the risk areas after integration on the chip coordinates on which the patterns are disposed.

Then, the intermediary control section 202 executes a process for integrating the plurality of risk level maps 213, i.e., the design-side risk level map with the fabrication-side risk level map, in cooperation with the integration processing section 205 in Step S905 in FIG. 9. FIG. 21 shows an exemplary integration resultant risk level map generated by integrating the design-side risk level map with the fabrication-side risk level map. The integration resultant risk level map in FIG. 21 is arranged such that not only the design-side risk level map in FIG. 18 is integrated with the fabrication-side risk level map after the distribution in FIG. 20 so that their chip coordinates coincide, but also risk areas 14a, 14b, 14c, 14d and 14e are generated in the integration to manage overlapping parts, respectively. For instance, the integration-generated risk area 14a is generated at the area where the design-side risk area 12a overlaps with the fabrication-side risk area 13a. Then, the integration-generated risk area 14a is assigned with a new risk level calculated based on the risk level assigned to the design-side risk area 12a, the risk level assigned to the fabrication-side risk area 13a, the Integration Parameter B (normalization constant) 312, the Integration Parameter C (weighting constant) 313 and the Integration Parameter D (arithmetic expression) 314.

Then, the intermediary control section 202 executes a process for controlling boundaries of the risk level map 213 in cooperation with the boundary control section 206 in Step S906 in FIG. 9. For instance, the intermediary control section 202 defines an important area in a range of mesh Nos. 0 through 28 of the X-coordinate as shown in FIG. 21. Then, the intermediary control section 202 deletes the risk areas 12*d*, 13*g*, 13*f*, 13*f*1, 13*f*2 and 13*f*3 not included in the important area.

Figure 22:
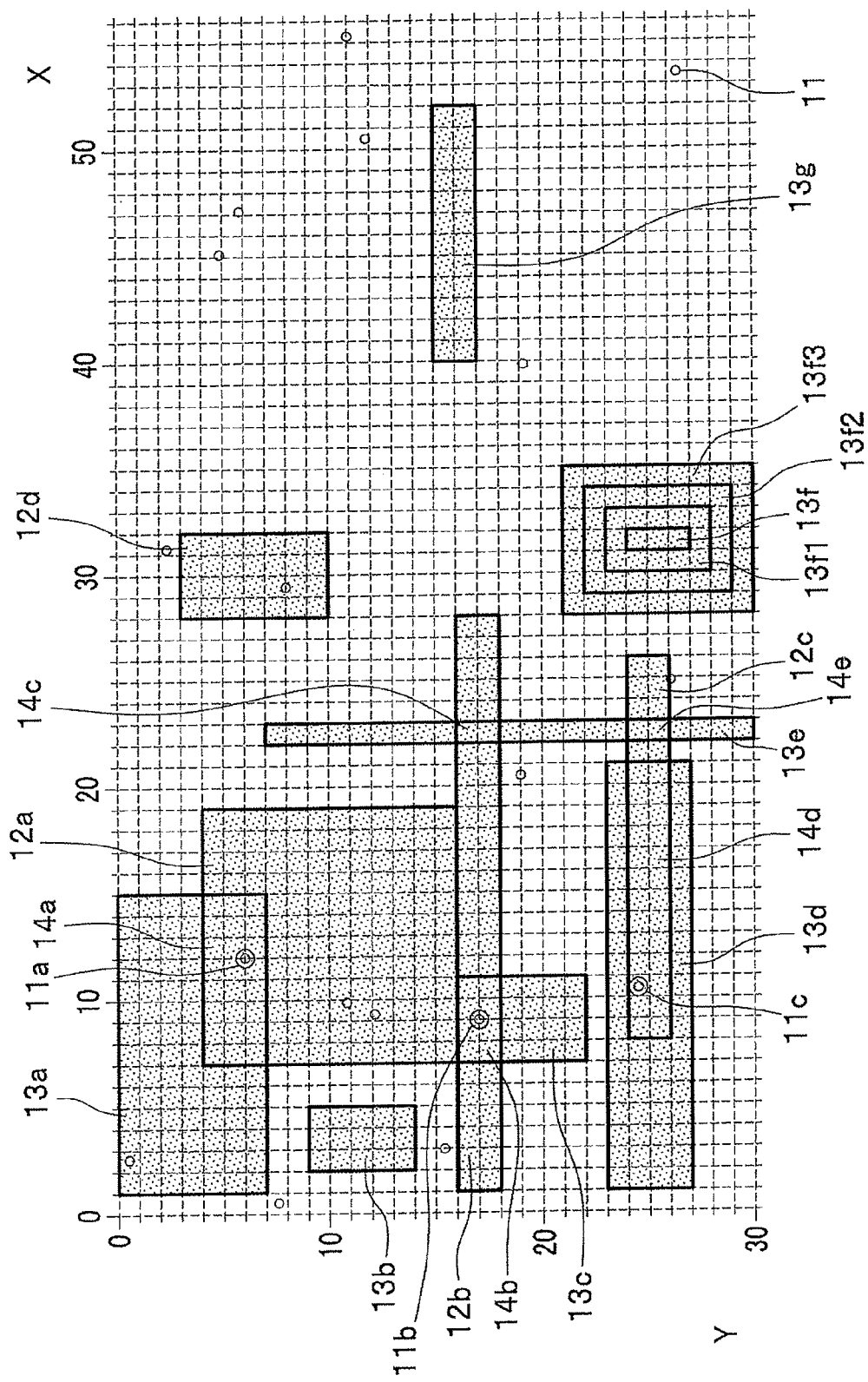
FIG. 22 is a distribution chart (superimposition resultant risk level map) of the risk areas and the hot spots after superimposition on the chip coordinates on which the patterns are disposed.

Next, the intermediary control section 202 executes a process for superimposing the risk level map 213 with the respective hot spots within the hot spot information 215 in cooperation with the superimposition processing section 207 in Step S907 in FIG. 9. FIG. 22 shows an exemplary superimposition resultant risk level map generated by superimposing the risk level map in FIG. 21 with the respective hot spots within the hot spot information 215 so that their chip coordinates coincide from each other. Then, the hot spots located within the risk areas 14*a*, 14*b* and 14*d* whose risk level exceeds a risk level threshold value (corresponding substantially to the Boundary Control Parameter A (risk level threshold value) in FIG. 3) may be picked out as evaluation object hot spots 11*a*, 11*b* and 11*c* (as indicated by double circles in FIG. 22).

Next, the intermediary control section 202 executes a processing process on a result of the superimposing process in cooperation with the processing section 210 in Step S908 in FIG. 9. In the processing process, the intermediary control section 202 executes a rearrangement process, a coloring process and others in connection with how to show the whole results and how to show in unit of the risk level map based on the Processing Parameter A (how to show the whole results) 319 and the Processing Parameter B (how to show in unit of risk level map) 320 in the selection and/or complementation setting 211 in FIG. 3. The client terminal 103 displays a result of this processing process on its screen, so that the operator can select or complement the hot spots to be evaluated in a mass-production stage. The selection and/or complementation result is stored in the design and fabrication integrated database 105 as the Selection and/or Complementation Result 214. Thus, the evaluation object pattern determining method (hot spot selecting method) ends.

Figure 10:
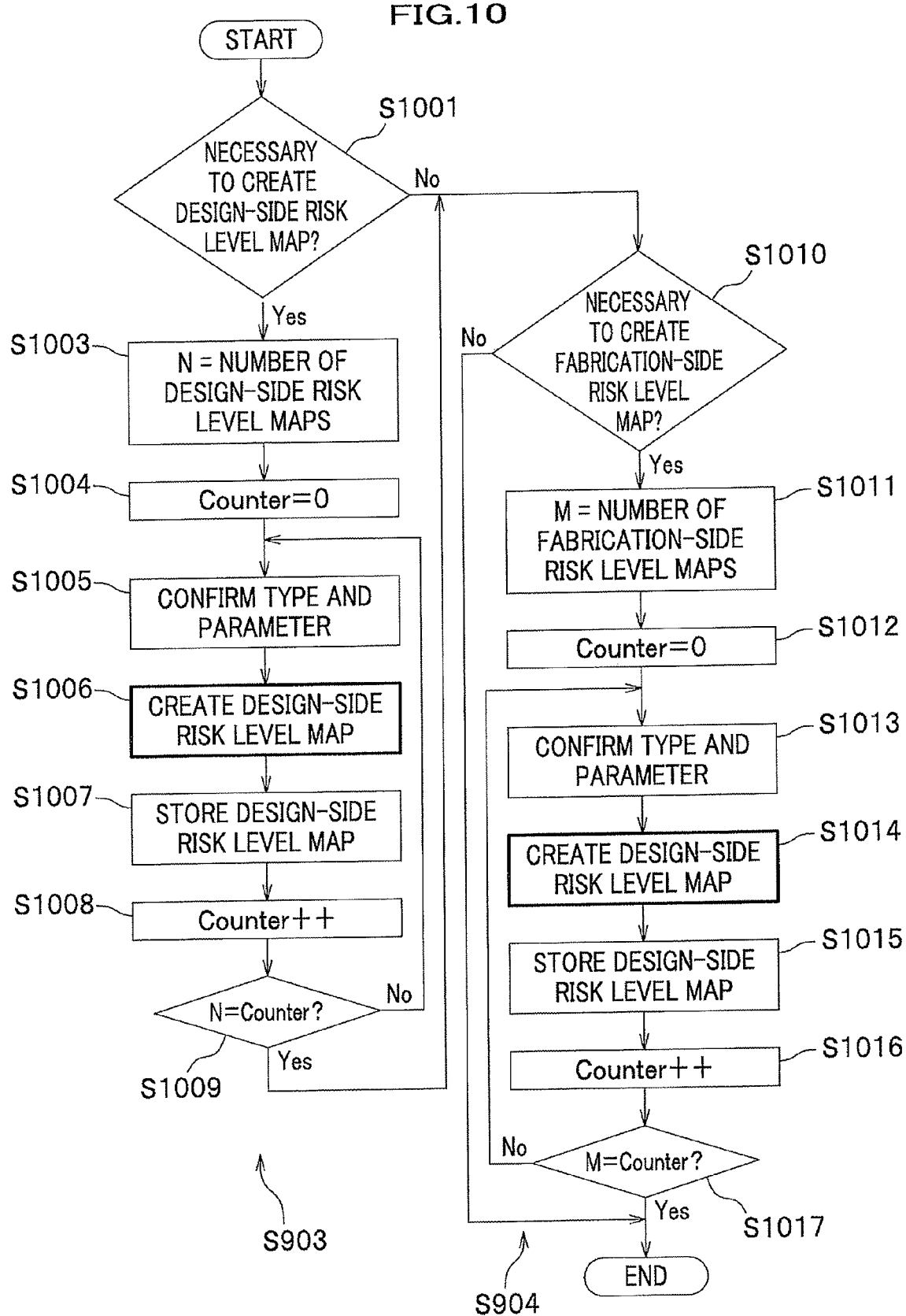
FIG. 10 is a flowchart for carrying out processes for creating a risk level map based on design characteristics in Step S903 and for creating a risk level map based on fabrication characteristics in Step S904 in FIG. 9.

FIG. 10 shows a flowchart for carrying out the processes for creating the risk level map based on the design characteristics in Step S903 and for creating the risk level map based on the fabrication characteristics in Step S904 in FIG. 9.

At first, the intermediary control section 202 determines whether it is necessary or not to create a design-side risk level map by referring to the Number of Design-side Risk Level Maps 305 of the selection and/or complementation setting 211 (see FIG. 3) in Step S1001. If the Number of Design-side Risk Level Maps 305 is 1 or more, i.e., Yes in Step S1001, the intermediary control section 202 stores the Number of Design-side Risk Level Maps 305 in variable N in Step S1003. If the variable N is less than 1, i.e., No in Step S1001, it is not necessary to create any design-side risk level map and the process advances to Step S1010.

Next, the intermediary control section 202 stores 0 (zero) in a counter that counts a number of repetitions of a loop composed of Steps S1005 through S1009 described later in Step S1004. Then, the intermediary control section 202 confirms the Characteristic Type 306 and the Parameter 307 in the selection and/or complementation setting 211 in Step S1005 and creates the design-side risk level map based on the Characteristic Type 306 and the Parameter 307 in Step S1006. The intermediary control section 202 stores the design-side risk level map in the design and fabrication integrated database 105 as the risk level map 213 in Step S1007 and increments the counter by one in Step S1008. In Step S1009, the intermediary control section 202 determines whether or not the variable N (the Number of Design-side Risk Level Maps 305) is equal to the number of the counter. If the variable N is not equal to the number of the counter, i.e., No in Step S1009, the process returns to and repeats Step S1005 and thereafter. If the variable N is equal to the number of the counter, i.e., Yes in Step S1009 and the required Number of Design-side Risk Level Maps has been created and stored, the process advances to Step S1010.

In Step S1010, the intermediary control section 202 determines whether it is necessary or not to create a fabrication-side risk level map by referring to the Number of Fabrication-side Risk Level Maps 308 of the selection and/or complementation setting 211 (see FIG. 3). If the Number of Fabrication-side Risk Level Maps 308 (variable M) is 1 or more, i.e., Yes in Step S1010, the intermediary control section 202 stores the Number of Fabrication-side Risk Level Maps 308 in variable M in Step S1011. If the variable M is less than 1, i.e., No in Step S1010, it is not necessary to create any fabrication-side risk level map and the intermediary control section 202 ends this process.

Then, the intermediary control section 202 stores 0 (zero) in a counter that counts a number of repetitions of a loop composed of Steps S1013 through S1017 described later in Step S1012. Next, the intermediary control section 202 confirms the Characteristic Type 309 and the Parameter 310 in the selection and/or complementation setting 211 in Step S1013 and creates the fabrication-side risk level map based on the Characteristic Type 309 and the Parameter 310 in Step S1014. The intermediary control section 202 stores the fabrication-side risk level map in the design and fabrication integrated database 105 as the risk level map 213 in Step S1015 and increments the counter by one in Step S1016. In Step S1017, the intermediary control section 202 determines whether or not the variable M (the Number of Fabrication-side Risk Level Maps 308) is equal to the number of the counter. If the variable M is not equal to the number of the counter, i.e., No in Step S1017, the process returns to and repeats Step S1013 and thereafter. If the variable M is equal to the number of the counter, i.e., Yes in Step S1017 and the required Number of Fabrication-side Risk Level Maps have been created and stored, this processing flow ends.

Figure 11:
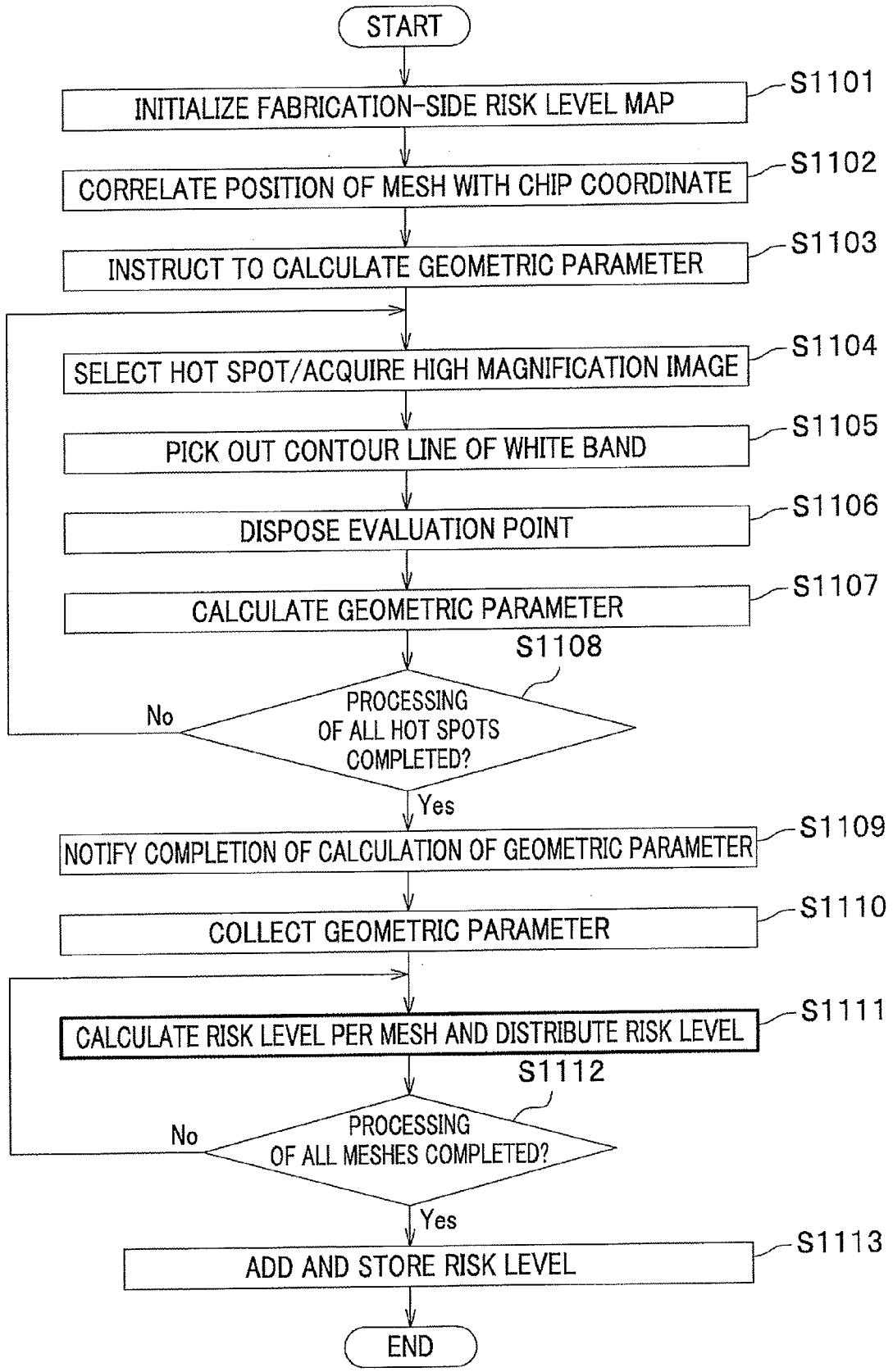
FIG. 11 is a flowchart for carrying out a process for creating the fabrication-side risk level map in Step S1014 in FIG. 10.

FIG. 11 shows a flowchart for carrying out the process for creating the fabrication-side risk level map in Step S1014 in FIG. 10.

At first, the intermediary control section 202 initializes the risk level map 213 in FIG. 4 to create the fabrication-side risk level map in Step S1101. The intermediary control section 202 stores a sequence number of the risk level map 213 in the Identifier 401 (see FIG. 4), stores "NONE" in the Integration Flag 402, stores the Characteristic Type 309 (see FIG. 3) in the Characteristic Type 403, stores the Parameter 310 (see FIG. 3) and others to the Characteristic Property A405 (see FIG. 4), stores a number of the Characteristic Property A405 and others in the Number of Characteristic Properties 404 and stores 0 (zero) in the Number of Areas 408.

Next, referring to the Chip Size 322 and the Mesh Size 304 in the selection and/or complementation setting 211 (see FIG. 3), the intermediary control section 202 correlates position of the meshes with the chip coordinates in Step S1102. Then, the intermediary control section 202 instructs the control sections 109 and 113 of the measuring SEMs 107 and 110 (see FIG. 1) corresponding to the Measuring SEM Identifier 303 of the selection and/or complementation setting 211 to calculate geometric parameters and transmits the Characteristic Type 309 and the Parameter 310 confirmed in Step S1013 to the control sections in Step S1103. It is noted that the present embodiment shows a case when the measuring SEM 107 is specified in the Measuring SEM Identifier 303. In Step S1104, the control section 109 of the measuring SEM 107 acquires a highly magnified image while individually selecting each hot spot within the hot spot information 215 obtained in Step S902 in FIG. 9. The highly magnified image is stored in the SEM image managing section 106 (see FIG. 1).

In Step S1105, the SEM image managing section 106 picks out a profile (profile line) of a white band from the highly magnified image. Then, the SEM image managing section 106 acquires the CAD data that has been acquired by the control section 109 in Step S902 in FIG. 9 from the control section 109 and disposes evaluation points on the CAD data (designed pattern of the LSI chip) in Step S1106. In Step S1107, the SEM image managing section 106 calculates geometric parameters and then notices that the calculation of the geometric parameters has been completed to the control section 109. The SEM image managing section 106 calculates the geometric parameters from deviations between the imaged profile and the designed pattern (CAD data). Specifically, the geometric parameters are a displacement, an expansion or shrinkage and a deformation volume of the imaged profile with respect to the designed pattern. It is noted the methods described in JP 2004-228394A may be used specifically as the methods of Steps S1104, S1105, S1106 and S1107 in the present embodiment. It is assumed here that the Characteristic Type 309 and the Parameter 310 received by the control section 109 of the measuring SEM 107 in Step S1103 are used as variables necessary for calculating the geometric parameters.

In Step S1108, the control section 109 determines whether or not the processes in Steps S1104, S1105, S1106 and S1107 have been completed on all of the hot spots. If the control section 109 determines that the processes have not been completed yet, i.e., No in Step S1108, the control section 109 returns to Step S1104 to repeat the processes in those Steps. If the control section 109 determines that the processes have been completed, i.e., Yes in Step S1108, the control section 109 advances to and executes Step S1109.

In Step S1109, the control section 109 notifies that the processes related to the calculation of geometric parameters on all of the hot spots have been completed to the fabrication-side data collecting section 203. Based on this report, the fabrication-side data collecting section 203 collects the geometric parameters from the SEM image managing section 106 and transmits them to the intermediary control section 202 in Step S1110. The intermediary control section 202 transmits an instruction of starting to create the risk level map to the risk level map creating section 204 by specifying the Characteristic Type 309 and the Parameter 310 confirmed in Step S1013 and the geometric parameters. Then, the risk level map creating section 204 selects one mesh out of the fabrication-side risk level map initialized in Step S1101, calculates a risk level of a risk area corresponding to that mesh and distributes risk levels to related meshes in Step S1111. It is noted that a result of the correlation of the mesh position with the chip coordinate in Step S1102 is used in correlating the mesh with the risk area.

In Step S1112, the risk level map creating section 204 determines whether or not the process on the all meshes has been completed. If the risk level map creating section 204 determines that the process has not been completed, i.e., No in Step S1112, the risk level map creating section 204 returns to and executes Step S1111. If the risk level map creating section 204 determines that the process has been completed, i.e., Yes in Step S1112, the risk level map creating section 204 advances to and executes Step S1113.

In Step S1113, the risk level map creating section 204 adds the risk levels calculated in Steps S1111 and S1112 per mesh, generates a risk area by collecting adjacent meshes whose risk level is equal and stores it in the risk level map 213. After completing Step S1113, the risk level map creating section 204 notifies that the process in Step S1113 has been completed to the intermediary control section 202 and ends this processing flow.

It is noted that one measuring SEM 107 has been specified in the Measuring SEM Identifier 303 (see FIG. 3) in the present embodiment, it is also possible to accommodate to a case when the plurality of measuring SEMs 107 and 110 is specified by repeating Steps of the processing flow described above, i.e., Steps S1103, S1104, S1105, S1106, S1107, S1108, S1109, S1110, S1111, S1112 and S1113. Still more, although the intermediary control section 202 and the risk level map creating section 204 creates the risk level map 213 based on the Characteristic Type 309 and the Parameter 310 confirmed in Step S1013 and the SEM image as the fabrication-side data in the processing flow described above, they may create the risk level map 213 by using data manually inputted from the local terminals 117 and 118 (see FIG. 1) and data collected in the fabrication line 119 as the fabrication-side data. Further, although the risk level map 213 in units of chip has been created from the characteristics of the apparatuses caused by instrumental errors such as the exposure amount, focus and aberration from the fabrication-side data, it is possible to create a risk level map in units of wafer from wafer characteristics such as deflection of the wafer, an error of height caused by chemical-mechanical polishing (CMP) and others from the fabrication-side data and to create the risk level map 213 in units of chip from such risk level map. In this case, an identifier for uniquely discriminating the wafer may be stored in the Identifier 401, the Characteristic property A405 or the like in the Risk level map 213 (see FIG. 4).

Figure 12:
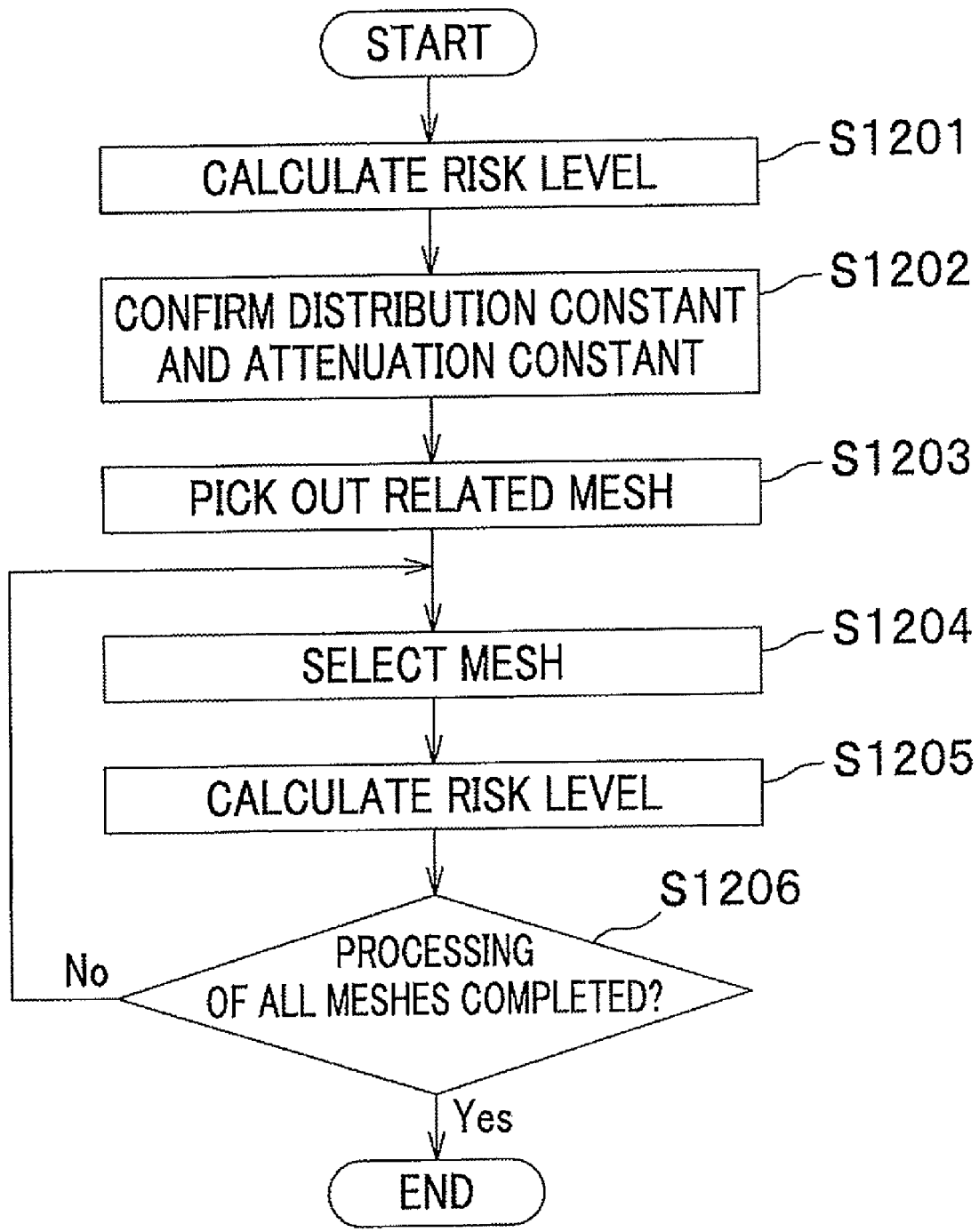
FIG. 12 is a flowchart for carrying out processes for calculating and distributing a risk level per mesh in Step S1111 in FIG. 11.

FIG. 12 is a flowchart for carrying out the processes of calculating and distributing the risk level per mesh in Step S1111 in FIG. 11. It is possible to calculate the risk level per mesh by performing this risk level calculating and distributing processes.

At first, the risk level map creating section 204 calculates the risk level based on the geometric parameters described above in Step S1201. Specifically, the risk level map creating section 204 selects evaluation points existing in a mesh area to be evaluated, calculates a risk level per evaluation point by using a function whose argument is the geometric parameter that is a result of analysis of the evaluation point and calculates the risk level per mesh by adding those risk levels per mesh. A displacement, an expansion or shrinkage and a deformation volume described in JP 2004-228394A may be used here as the geometric parameters. Or, assuming that the evaluation points existing in a certain mesh area as being an evaluation point 1, an evaluation point 2, . . . an evaluation point N and that results of the analysis of as an evaluation point M (where $1 \leq M \leq N$) as being a displacement M, an expansion or shrinkage M and a deformation volume M, a risk level M of the evaluation point M may be represented as G (displacement M, expansion or shrinkage M and deformation volume M). Thus, it becomes possible to calculate the risk level of the mesh by G (displacement 1, expansion or shrinkage 1 and deformation volume 1)+G (displacement 2, expansion or shrinkage 2 and deformation volume 2)+ . . . +G (displacement M, expansion or shrinkage M and deformation volume M)+ . . . +G (displacement N, expansion or shrinkage N and deformation volume N).

Next, the risk level map creating section 204 confirms the Distribution Constant 802 and the Attenuation Constant 803 based on the risk level per mesh and the Risk Level Distribution Condition 323 (see FIG. 8A) in 1102. Then, the risk level map creating section 204 picks out related meshes based on the Distribution Constant 802 in Step S1203 and selects on mesh among the related meshes in Step S1204 to calculate a risk level of the mesh by using the Attenuation Constant 803 in Step S1205. Here, the risk level map creating section 204 will not select the mesh redundantly in Step S1204. Next, the risk level map creating section 204 determines whether or not these processes have been completed on all of the meshes in Step S1206. This processing flow ends if the risk level map creating section 204 determines that the processes have been completed, i.e., Yes in Step S1206, or the process returns to Step S1204 to repeat the processes described above if the risk level map creating section 204 determines that those processes have not been completed yet, i.e., No in Step S1206.

Figure 13:
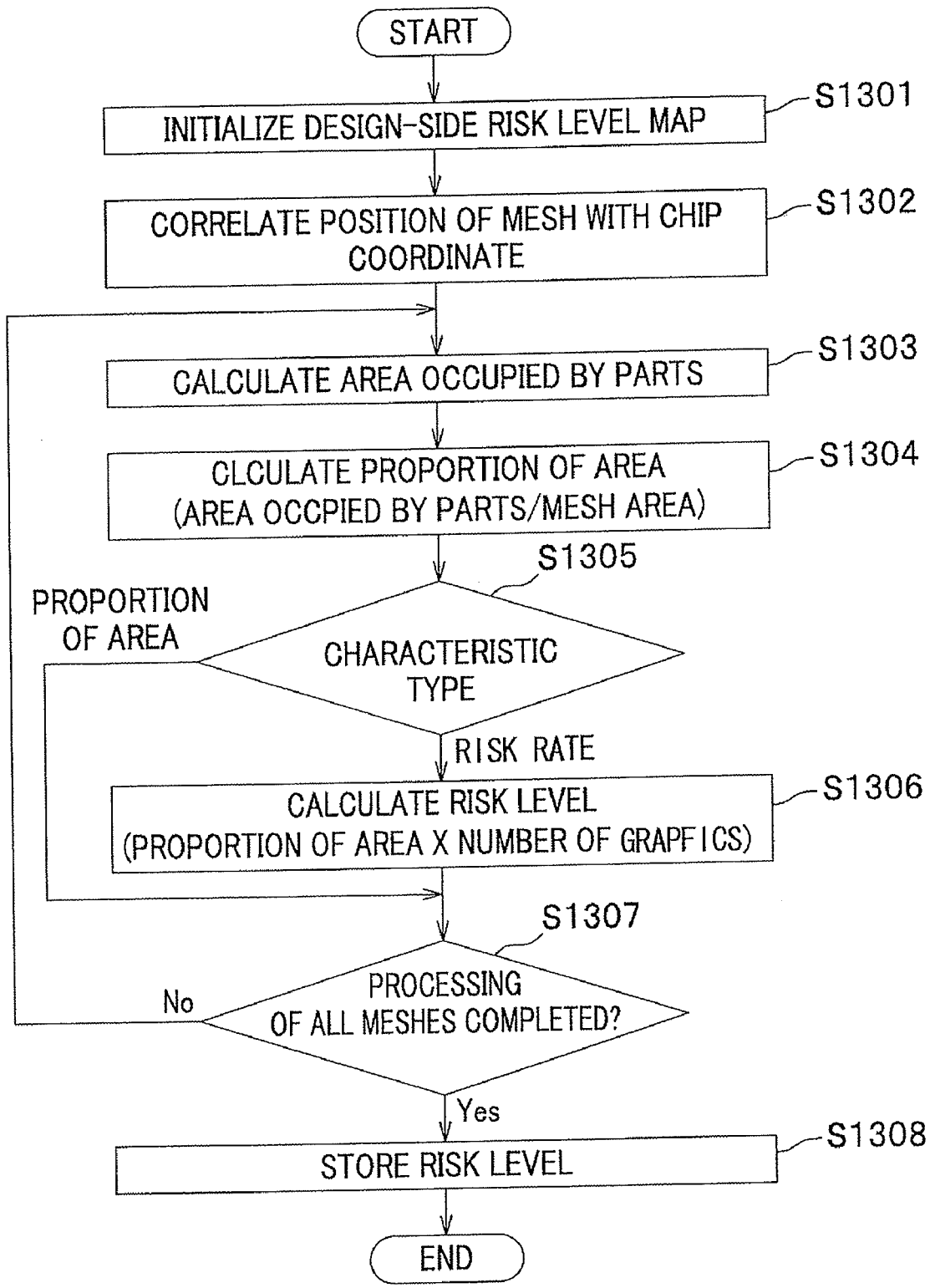
FIG. 13 is a flowchart for carrying out a process for creating a design-side risk level map in Step S1006 in FIG. 10.

FIG. 13 is a flowchart for carrying out the process for creating the design-side risk level map in Step S1006 in FIG. 10. At first, the intermediary control section 202 initializes the risk level map 213 in FIG. 4 to create the design-side risk level map in Step S1301. In the initialization, the intermediary control section 202 stores a sequence number of the risk level map 213 in the Identifier 401, stores "NONE" in the Integration Flag 402, stores the Characteristic Type 306 (see FIG. 3) in the Characteristic Type 403, stores the Parameter 307 (see FIG. 3) and others in the Characteristic Property A405 and others, stores a number of the Characteristic Property A405 and others in the Number of Characteristic Properties 404 and stores 0 (zero) in the Number of Areas 408. Next, referring to the Chip Size 322 and the Mesh Size 304 in the selection and/or complementation setting 211, the intermediary control section 202 correlates position of the meshes with the chip coordinates in Step S1302.

Then, the intermediary control section 202 instructs the control sections 109 and 113 of the measuring SEMs 107 and 110 (see FIG. 1) corresponding to the Measuring SEM Identifier 303 of the selection and/or complementation setting 211 to calculate the geometric parameters and transmits the Characteristic Type 306 and the Parameter 307 confirmed in Step S1005 to the control sections. It is noted that the present embodiment shows the case when the measuring SEM 107 is specified in the Measuring SEM Identifier 303.

The intermediary control section 202 transmits the instruction of creating a risk level map to the risk level map creating section 204 by specifying the Characteristic Type 306 and the Parameter 307 confirmed in Step S1005 and the geometric parameters described above. The risk level map creating section 204 selects one mesh out of the design-side risk level map initialized in Step S1301 to calculate a proportion of part occupied area in an area corresponding to the selected mesh in Step S1303. The part occupied area is an area of the mesh occupied by the pattern of the LSI chip. Next, the risk level map creating section 204 calculates the proportion of area (part occupied area/area of mesh) from the part occupied area described above in Step S1304. The proportion of area is a proportion of the part occupied area to the area of the mesh.

It is noted that the correlation result of the mesh position and the chip coordinate in Step S1102 is used in correlating the mesh with the risk area described above in Steps S1303 and S1304.

Next, the risk level map creating section 204 determines the Characteristic Type 306 in Step S1305. If the Characteristic Type 306 is an identifier indicative of the proportion of area, i.e., Proportion of Area in Step S1305, the risk level map creating section 204 advances to Step S1307. If the Characteristic Type 306 is an identifier indicative of a risk rate, i.e., Risk Rate in Step S1305, the risk level map creating section 204 advances to and executes Step S1306. In Step S1306, the risk level map creating section 204 calculates the risk rate (=proportion of area×number of graphics). The number of graphics is a number of rectangular patterns composing the designed pattern of the LSI chip included in the mesh.

Next, the risk level map creating section 204 determines whether or not the processes on the whole meshes have been completed in Step S1307. If the risk level map creating section 204 determines that the processes described above have not been completed yet, i.e., No in Step S1307, the risk level map creating section 204 returns to and executes Step S1303. If the risk level map creating section 204 determines that the processes have been completed, i.e., Yes in Step S1307, the risk level map creating section 204 advances to and executes Step S1308.

In Step S1308, the risk level map creating section 204 calculates risk levels by normalizing the proportion of area or the risk rate calculated in Steps S1303, S1304, S1305, S1306 and S1307, adds those risk levels per mesh, generates a risk area by collecting adjacent meshes whose risk level is equal and stores it in the risk level map 213. After completing Step S1308, the risk level map creating section 204 notifies that the process has been completed to the intermediary control section 202 and ends this processing flow.

Figure 14:
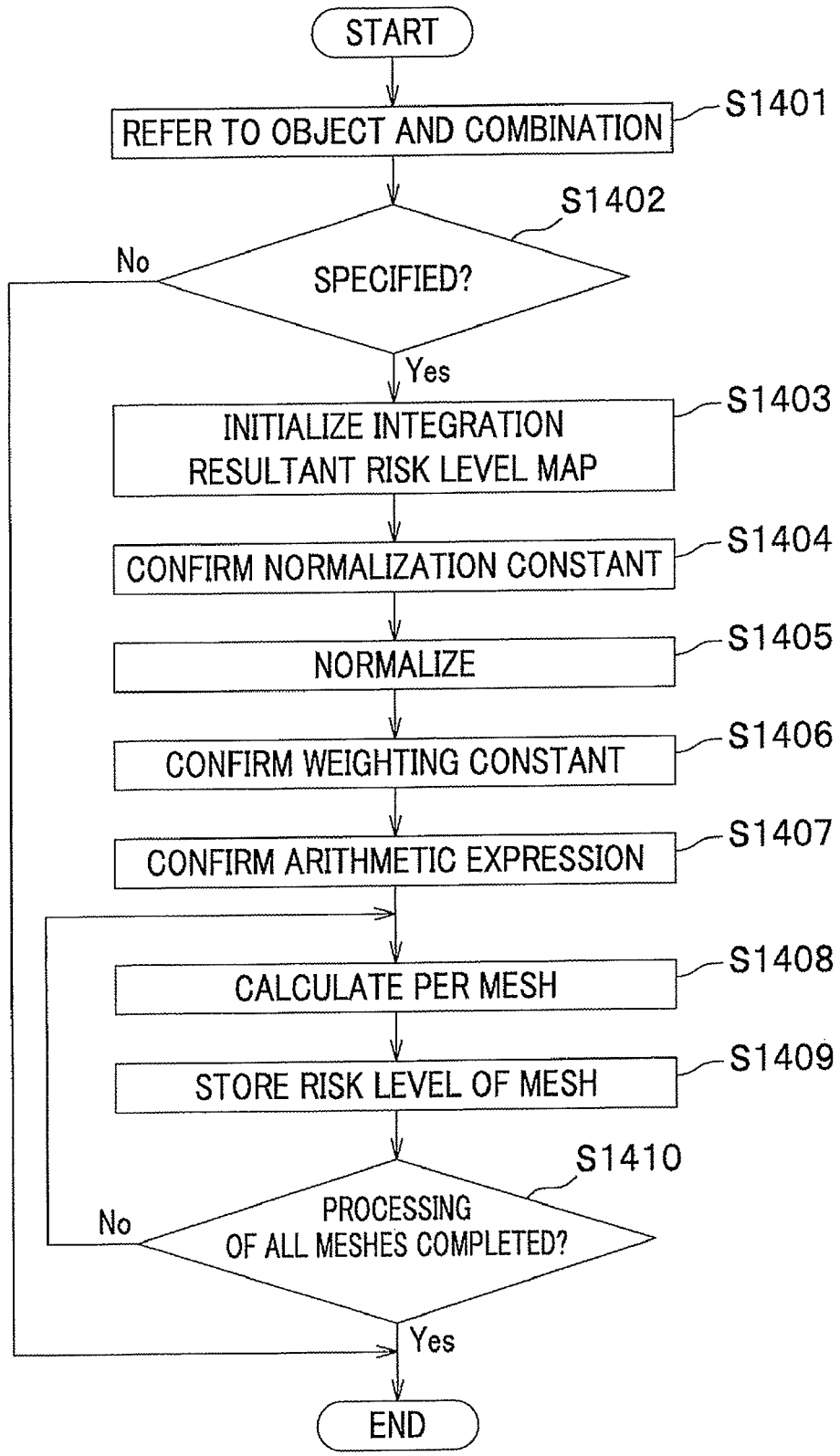
FIG. 14 is a flowchart for carrying out a process for integrating the risk level maps in Step S905 in FIG. 9.

FIG. 14 shows a flowchart for carrying out the process for integrating the risk level maps in Step S905 in FIG. 9. At first, the intermediary control section 202 refers to the Integration Parameter A (object and combination) 311 (see FIG. 3) describing risk level maps to be integrated and its combination in Step S1401. Next, the intermediary control section 202 determines whether or not the risk level map and the combination described above are specified in the Integration Parameter A (object and combination) 311 in Step S1402. If the risk level map and the combination are not specified, i.e., No in Step S1402, the intermediary control section 202 ends this processing flow. If the risk level map and the combination are specified, i.e., Yes in Step S1402, the intermediary control section 202 advances to and executes Step S1403.

In Step S1403, the intermediary control section 202 initializes the risk level map 213 (see FIG. 4) to create an integration resultant risk level map for storing the integration result. In the initialization, the intermediary control section 202 stores a sequence number of the risk level map 213 in the Identifier 401, stores a value indicative of "exist" in the Integration Flag 402, stores the Characteristic Type 309 (see FIG. 3) in the Characteristic Type 403, stores the Integration Parameter A (object and combination) 311 in the Characteristic Type 403 and stores 0 (zero) in the Number of Characteristic Properties 404 and the Number of Areas 408.

Next, the intermediary control section 202 specifies the Integration Parameter A (object and combination) 311, the risk level map 213 and the selection and complementation setting 211 (see FIG. 3) to instruct the integration processing section 205 to carry out an integrating process. The integration processing section 205 confirms a normalization constant by referring to the Integration Parameter B (normalization constant) 312 in Step S1403 and normalizes among the risk level maps specified by the Integration Parameter A (object and combination) 311 by using the normalization constant in Step S1405.

Next, the integration processing section 205 confirms a weighting constant by referring to the Integration Parameter C (weighting constant) 313 in Step S1406. The integration processing section 205 also confirms an arithmetic expression by referring to the Integration Parameter D (arithmetic expression) in Step S1407. The integration processing section 205 selects meshes belonging to a predetermined risk area from the risk level map specified in the Integration Parameter A (object and combination) 311 and carries out an arithmetic processing on these meshes based on the arithmetic expression described above to calculate an integration resultant risk level per mesh in Step S1408. The integration processing section 205 generates a risk area by collecting the adjacent meshes whose risk level is equal, generates the Identifier 409 (see FIG. 4), the Upper Left Coordinate 410, the Size 411 and the Risk Level 412 of the generated risk area and stores them in predetermined positions of the risk level map 213 (combined risk level map) in Step S1409.

Next, the integration processing section 205 confirms whether or not the processes described above have been completed on the meshes belong to all risk areas in Step S1410. If the integration processing section 205 determines that the processes have not been completed yet, i.e., No in Step S1410, the integration processing section 205 returns to and executes Step S1408. If the integration processing section 205 determines that the processes have been completed, i.e., Yes in Step S1410, the integration processing section 205 notifies that the processes have been completed to the intermediary control section 202 and ends this processing flow. Here, the integration processing section 205 will not select the mesh redundantly in Step S1408. It is noted that the normalization constant, the weighting constant and the arithmetic expression may be stored also in the Characteristic Property A405 (see FIG. 4) and others. In this case, a predetermined number determined by the normalization constant, the weighting constant and the arithmetic expression is stored in the Number of Characteristic Properties 404.

Figure 15:
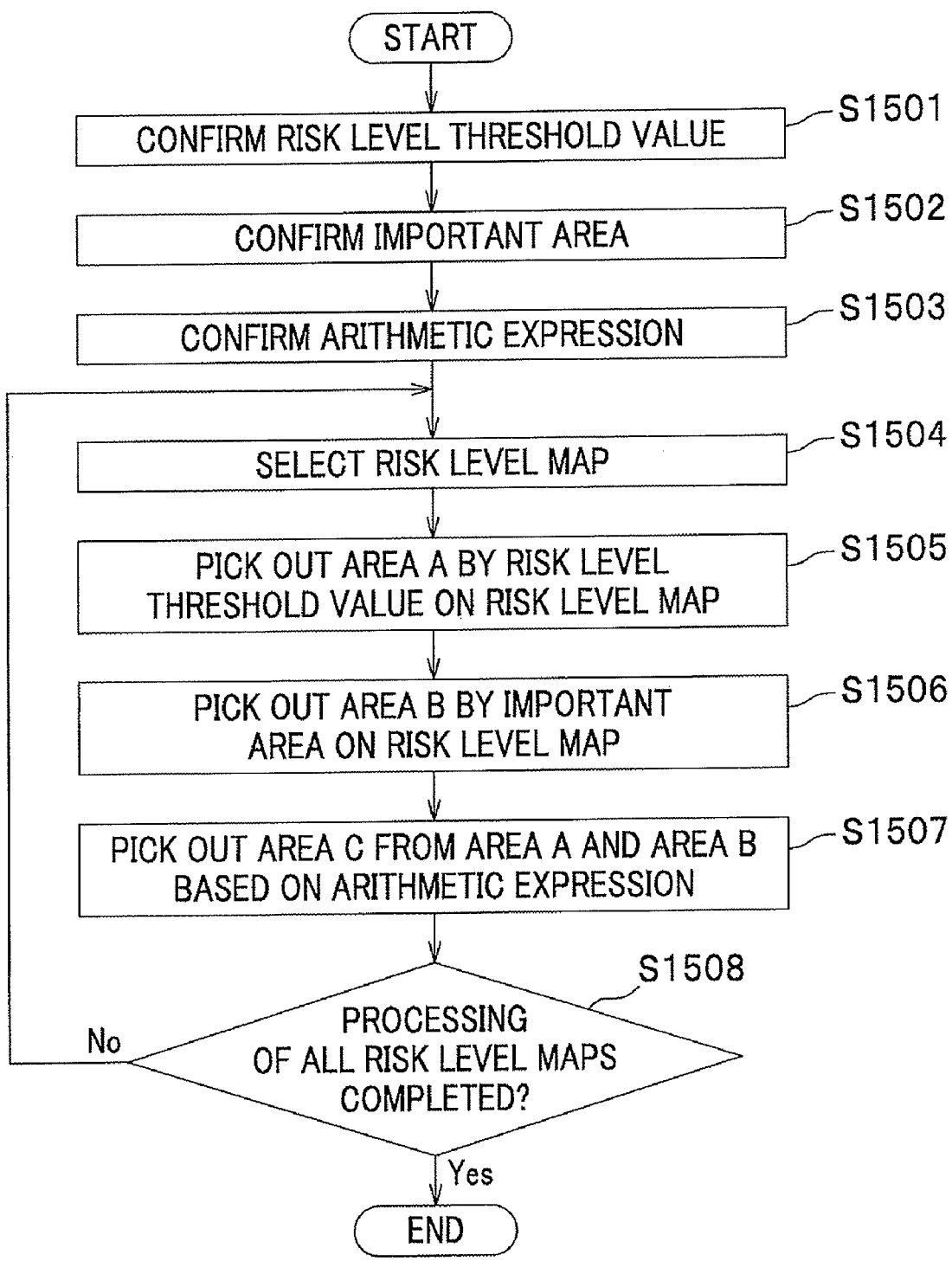
FIG. 15 is a flowchart for carrying out a process for controlling a boundary of the risk level map in Step S906 in FIG. 9.

FIG. 15 shows a flowchart for carrying out the process of controlling the boundary of the risk level map in Step S906 in FIG. 9. At first, the intermediary control section 202 specifies the selection and/or complementation setting 211 (see FIG. 3) and instructs the boundary control section 206 to carry out the boundary control process. Then, the boundary control section 206 confirms a risk level threshold value by referring to the Boundary Control Parameter A (risk level threshold value) 315 in Step S1501. The boundary control section 206 also confirms an important area by referring to the Boundary Control Parameter B (important area) 316 in Step S1502 and confirms the arithmetic expression by referring to the Boundary Control Parameter C (arithmetic expression) 321 in Step S1503.

Next, the boundary control section 206 selects a predetermined risk level map 231 in Step S1504. Then, the boundary control section 206 picks out a risk area A found by setting the risk level threshold value described above as a risk level threshold value on the risk level map 213 in Step S1505 and picks out a risk area B located in the important area from the risk level map 213 in Step S1506. The boundary control section 206 also picks out a risk area C obtained by carrying out the arithmetic operation based on the arithmetic expression on the risk areas A and B in Step S1507.

Next, in Step S1508, the boundary control section 206 determines whether or not the processes described above have been carried out on all of the risk level maps selected in Step S1504. If the boundary control section 206 determines that the processes have not been completed yet, i.e., No in Step S1508, the boundary control section 206 returns to and executes Step S1504. If the boundary control section 206 determines that the processes have been completed, i.e., Yes in Step S1508, the boundary control section 206 notifies that the processes have been completed to the intermediary control section 202 and ends this processing flow.

Figure 16:
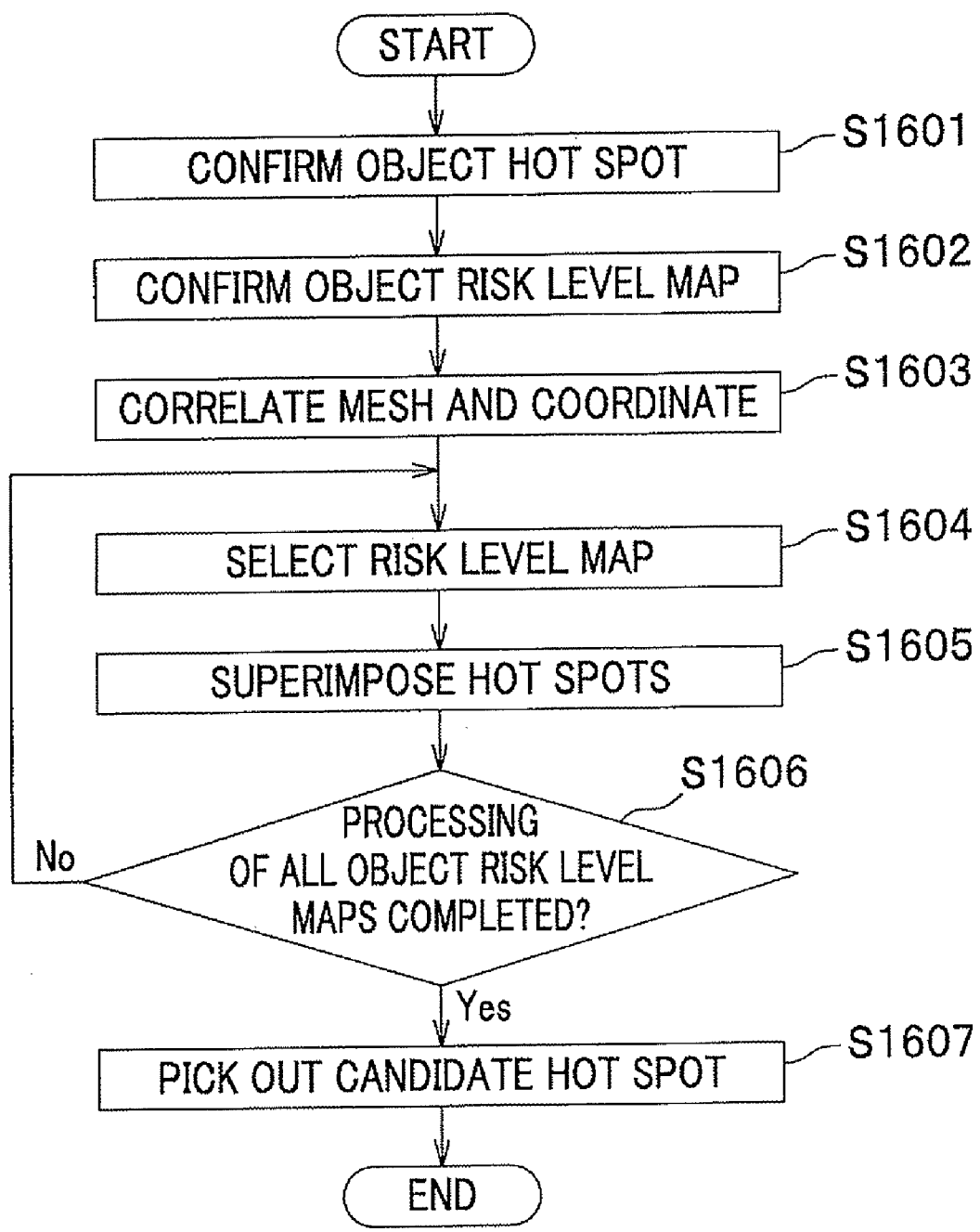
FIG. 16 is a flowchart for carrying out a process for superimposing the hot spots in Step S906 in FIG. 9.

FIG. 16 shows a flowchart for carrying out the process of superimposing the hot spots in Step S906 in FIG. 9. The respective hot spots in the hot spot information 215 are superimposed to the risk level map 213 by the hot spot superimposing process in Step S907.

At first, the intermediary control section 202 specifies the selection and/or complementation setting 211 (see FIG. 3) and instructs the superimposition processing section 207 to carry out the superimposing process. The superimposition processing section 207 confirms hot spots to be superimposed (referred to as object hot spots hereinafter) by referring to the Superimposition Parameter A (object hot spot identifier) 317 (see FIG. 3) in Step S1601. The superimposition processing section 207 also confirms risk level maps to be superimposed (referred to as object risk level maps hereinafter) by referring to the Superimposition Parameter B (object risk level map) 318 in Step S1602. Next, the superimposition processing section 207 correlates the mesh position with the chip coordinate in Step S1603.

Then, the superimposition processing section 207 selects a predetermined risk level map out of the object risk level maps in Step S1604 and superimposes the object hot spots respectively to the risk level map selected as described above in Step S1605.

Next, the superimposition processing section 207 determines whether or not the processes described above have been completed on the all object risk level maps in Step S1606. If the superimposition processing section 207 determines that the processes have not been completed yet, i.e., No in Step S1606, the superimposition processing section 207 returns to and executes Step S1604. If the superimposition processing section 207 determines that the processes have been completed, i.e., Yes in Step S1606, the superimposition processing section 207 advances to and executes Step S1607.

In Step S1607, the superimposition processing section 207 picks out candidates of hot spots to be evaluated based on a result of the boundary control in FIG. 5 and a result of the superimposition and stores them to the processing result 212 in FIG. 6. The superimposition processing section 207 notifies that the processes have been completed to the intermediary control section 202 and completes this processing flow.

While the several embodiments of the invention have been described above, it should be understood that the invention may be changed or modified without departing from the sprit of the invention. Therefore, the invention is intended not to be bound by the details shown and described above and to cover all such changes and modifications within the scope of the appended claims.

What is claimed is:

1. An evaluation object pattern determining apparatus for use in a pattern evaluating system having a CAD data managing section storing patterns of a LSI chip as CAD data, a simulator for picking out coordinates of local patterns whose process margin is small out of the pattern of the LSI chip from the CAD data by way of simulation and an observation instrument for assisting observation of the local patterns of the LSI chip produced in a fabrication line;

the evaluation object pattern determining apparatus determining coordinates of the local patterns to be observed by the observation instrument out of the coordinates of the local patterns picked out by the simulator and comprising:

a risk level map creating section for creating a risk level map in which risk areas are disposed on the pattern of the LSI chip;

the risk areas being assigned with risk levels obtained by digitizing that the risk area is an area whose process margin is smaller than that of other areas by the CAD data and at least one of fabrication data acquired in the fabrication line; and a superimposition processing section for superimposing the coordinates of the local patterns with the risk level map to pick out the coordinates of the local patterns located within the risk area.

2. The evaluation object pattern determining apparatus according to claim 1, wherein the pattern of the LSI chip is provided with chip coordinates; and positions of the local pattern and the risk area may be specified by the chip coordinates.

3. The evaluation object pattern determining apparatus according to claim 1, further comprising a boundary control section for carrying out at least one of tasks of deleting the risk areas assigned with a risk level less than a risk level threshold value out of the risk level map and of deleting the risk areas disposed in an area other than an important area.

4. The evaluation object pattern determining apparatus according to claim 2, further comprising an integration processing section for creating a plurality of risk level maps, dividing the pattern of the LSI chip to generate a plurality of meshes whose respective positions are correlated with the chip coordinates and calculating a combined risk level per mesh based on the risk level of the risk area per risk level map to which the mesh belongs.

5. The evaluation object pattern determining apparatus according to claim 2, wherein the risk level map creating section acquires a distribution constant and an attenuation constant based on the risk level and risk level distribution conditions;

divides the pattern of the LSI chip to generate a plurality of meshes whose respective positions are correlated with the chip coordinates;

picks out related meshes disposed around the mesh based on the distribution constant; and determines risk levels of the related meshes based on the attenuation constant.

6. The evaluation object pattern determining apparatus according to claim 2, wherein the risk level map creating section divides the pattern of the LSI chip to generate a plurality of meshes whose respective positions are correlated with the chip coordinates;

calculates a proportion of an area within the mesh occupied by the pattern of the LSI chip to the area of the mesh per mesh; and calculates a risk rate per mesh based on the proportion.

7. The evaluation object pattern determining apparatus according to claim 1, wherein the observation instrument images a profile of the local pattern to calculate geometric parameters from deviations between the local pattern and the profile based on the CAD data; and the risk level map creating section divides the pattern of the LSI chip to generate a plurality of meshes whose respective positions are correlated with the chip coordinates, calculates the risk level based on the geometric parameters and assigns the risk level to the mesh to which the local pattern belongs.

8. The evaluation object pattern determining apparatus according to claim 7, wherein the geometric parameter is at least one of a displacement, an expansion or shrinkage and a deformation volume of the profile with respect to the local pattern based on the CAD data.

9. An evaluation object pattern determining method for use in a pattern evaluating system having a CAD data managing section storing patterns of a LSI chip as CAD data, a simulator for picking out coordinates of local patterns whose process margin is small out of the pattern of the LSI chip from the CAD data by way of simulation and an observation instrument for assisting observation of the local patterns of the LSI chip produced in a fabrication line;

the evaluation object pattern determining method determining coordinates of the local patterns to be observed by the observation instrument out of the coordinates of the local patterns picked out by the simulator and comprising:

a risk level map creating step of creating a risk level map in which risk areas are disposed on the pattern of the LSI chip;

the risk areas being assigned with risk levels obtained by digitizing that the risk area is an area whose process margin is smaller than that of other areas by the CAD data and at least one of fabrication data acquired in the fabrication line; and a superimposition processing step of superimposing the coordinates of the local patterns with the risk level map to pick out the coordinates of the local patterns located within the risk area.

10. A non-transitory computer-readable medium embodying an evaluation object pattern determining program for use in a pattern evaluating system having a CAD data managing section storing patterns of a LSI chip as CAD data, a simulator for picking out coordinates of local patterns whose process margin is small out of the pattern of the LSI chip from the CAD data by way of simulation and an observation instrument for assisting observation of the local patterns of the LSI chip produced in a fabrication line;

the evaluation object pattern determining program causing a computer to determine coordinates of the local patterns to be observed by the observation instrument out of the coordinates of the local patterns picked out by the simulator and causing the computer to execute:

a risk level map creating procedure of creating a risk level map in which risk areas are disposed on the pattern of the LSI chip;

the risk areas being assigned with risk levels obtained by digitizing that the risk area is an area whose process margin is smaller than that of other areas by the CAD data and at least one of fabrication data acquired in the fabrication line; and a superimposition processing procedure of superimposing the coordinates of the local patterns with the risk level map to pick out the coordinates of the local patterns located within the risk area.

11. A pattern evaluating system having a CAD data managing section storing patterns of a LSI chip as CAD data, a simulator for picking out coordinates of local patterns whose process margin is small out of the pattern of the LSI chip from the CAD data by way of simulation and an observation instrument for assisting observation of the local patterns of the LSI chip produced in a fabrication line to evaluate the local pattern;

the pattern evaluating system having an evaluation object pattern determining apparatus for determining coordinates of the local patterns to be observed by the observation instrument out of the coordinates of the local patterns picked out by the simulator, the evaluation object pattern determining apparatus comprising:

a risk level map creating section for creating a risk level map in which risk areas are disposed on the pattern of the LSI chip;

the risk areas being assigned with risk levels obtained by digitizing that the risk area is an area whose process margin is smaller than that of other areas by the CAD data and at least one of fabrication data acquired in the fabrication line; and a superimposition processing section for superimposing the coordinates of the local patterns with the risk level map to pick out the coordinates of the local patterns located within the risk area.

* * * * *